US010695722B2

(12) United States Patent
Choi et al.

(10) Patent No.: US 10,695,722 B2
(45) Date of Patent: Jun. 30, 2020

(54) METHOD OF PREPARING PERM-SELECTIVE POROUS MEMBRANE AND METHOD OF SEPARATING GASES USING POROUS MEMBRANE PREPARED THEREBY

(71) Applicant: KOREA UNIVERSITY RESEARCH AND BUSINESS FOUNDATION, Seoul (KR)

(72) Inventors: Jungkyu Choi, Seoul (KR); Kwan Young Lee, Seoul (KR); Eunhee Jang, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 222 days.

(21) Appl. No.: 15/935,652

(22) Filed: Mar. 26, 2018

(65) Prior Publication Data
US 2018/0272288 A1 Sep. 27, 2018

(30) Foreign Application Priority Data

Mar. 24, 2017 (KR) .................. 10-2017-0037504

(51) Int. Cl.
 *B01D 67/00* (2006.01)
 *C01B 3/56* (2006.01)
 (Continued)

(52) U.S. Cl.
 CPC ....... *B01D 67/0079* (2013.01); *B01D 53/228* (2013.01); *B01D 67/0051* (2013.01);
 (Continued)

(58) Field of Classification Search
 CPC .............. B01D 53/228; B01D 67/0051; B01D 67/0076; B01D 67/0079; B01D 69/10;
 (Continued)

(56) References Cited

U.S. PATENT DOCUMENTS 7,179,325 B2 2/2007 Oyama et al.
2012/0310018 A1* 12/2012 Lai .................... B01D 53/228
568/913

(Continued)

FOREIGN PATENT DOCUMENTS

| JP | 2008-237945 A | 10/2008 |
| KR | 10-0648520 B1 | 11/2006 |
| KR | 10-1571622 B1 | 11/2015 |

OTHER PUBLICATIONS

De Lange, R. S. A., et al., "Sorption Studies of Microporous Sol-Gel Modified Ceramic Membranes," *Journal of Porous Materials*, vol. 2, Issue 2, Jun. 1995, pp. 141-149.

(Continued)

*Primary Examiner* — Jason M Greene
(74) *Attorney, Agent, or Firm* — NSIP Law

(57) ABSTRACT

The present invention relates to a method of preparing a perm-selective porous membrane and a method of separating gases using the prepared porous membrane. According to the present invention, a membrane is synthesized using a hierarchically structured alumina porous support by a counter diffusion method. During this synthesis, the diffusion rate of metal ions loaded on the porous support is controlled by controlling the pore size of the porous support, and the position at which the membrane is synthesized is controlled by synthesizing the membrane inside the support. This can increase the physical stability of the membrane and make the membrane thicker so as to ensure higher $H_2/CO_2$ separation factors.

15 Claims, 11 Drawing Sheets
(9 of 11 Drawing Sheet(s) Filed in Color)

Conventional ZIF-8 membrane

ZIF-8 membrane synthesized on porous membrane with controlled pore size

(51) Int. Cl.

| | |
|---|---|
| *B01D 71/02* | (2006.01) |
| *B01D 71/06* | (2006.01) |
| *B01D 69/02* | (2006.01) |
| *B01D 53/22* | (2006.01) |
| *B01D 69/12* | (2006.01) |
| *B01D 69/10* | (2006.01) |

(52) U.S. Cl.
CPC ......... *B01D 67/0076* (2013.01); *B01D 69/02* (2013.01); *B01D 69/105* (2013.01); *B01D 69/12* (2013.01); *B01D 71/022* (2013.01); *B01D 71/028* (2013.01); *B01D 71/06* (2013.01); *C01B 3/56* (2013.01); *B01D 2256/16* (2013.01); *B01D 2257/504* (2013.01); *B01D 2325/00* (2013.01); *B01D 2325/02* (2013.01); *B01D 2325/022* (2013.01); *B01D 2325/04* (2013.01); *B01D 2325/22* (2013.01); *C01B 2203/0405* (2013.01); *C01B 2203/0475* (2013.01)

(58) Field of Classification Search
CPC ...... B01D 69/105; B01D 69/12; B01D 71/02; B01D 71/022; B01D 71/028; B01D 71/06; B01D 2325/02; B01D 2325/022
See application file for complete search history.

(56) References Cited

U.S. PATENT DOCUMENTS

| | | | | |
|---|---|---|---|---|
| 2013/0313193 | A1* | 11/2013 | Nair ..................... | B01D 53/228 210/650 |
| 2015/0246318 | A1* | 9/2015 | Jeong ................... | B01D 53/228 427/595 |
| 2015/0251139 | A1 | 9/2015 | Jeong et al. | |
| 2019/0168173 | A1* | 6/2019 | Tsapatsis ........... | B01D 67/0072 |

OTHER PUBLICATIONS

Bowen, Paul, et al., "Colloidal processing and sintering of nanosized transition aluminas," *Powder Technology*, vol. 157, Issues 1-3, Sep. 2005, pp. 100-107.
Choi, Jungkyu, et al., "MFI zeolite membranes from a- and randomly oriented monolayers," *Adsorption*, Vo. 12, Issues 5-6, Sep. 2006, pp. 339-360.
Krishna, R., et al., "Using molecular simulations for screening of zeolites for separation of $CO_2/CH_4$ mixtures," *Chemical Engineering Journal*, vol. 133, Issues 1-3, Sep. 2007, pp. 121-131.
Liu, Dahuan, et al., "Understanding the Adsorption and Diffusion of Carbon Dioxide in Zeolitic Imidazolate Frameworks: A Molecular Simulation Study," *The Journal of Physical Chemistry C*, vol. 113, Feb. 2009, pp. 5004-5009.
Cravillon, Janosch, et al., "Rapid Room-Temperature Synthesis and Characterization of Nanocrystals of a Prototypical Zeolitic Imidazolate Framework," *Chemistry of Materials*, vol. 21, Issue 8, Mar. 2009, pp. 1410-1412.
Bux, Helge, et al., "Zeolitic Imidazolate Framework Membrane with Molecular Sieving Properties by Microwave-Assisted Solvothermal Synthesis," *Journal of the American Chemical Society*, vol. 131, Issue 44, Oct. 2009, pp. 16000-16001.
Krishna, Rajamani, et al., "In silico screening of zeolite membranes for $CO_2$ capture," *Journal of Membrane Science*, vol. 360, Issues 1-2, Sep. 2010, pp. 323-333.
Li, Yanshuo, et al., "Zeolitic imidazolate framework ZIF-7 based molecular sieve membrane for hydrogen separation," *Journal of Membrane Science*, vol. 354, Issues 1-2, May 2010, pp. 48-54.
Li, Yan-Shuo, et al., "Controllable Synthesis of Metal-Organic Frameworks: From MOF Nanorods to Oriented MOF Membranes," *Advanced Materials*, vol. 22, Issue 30, Aug. 2010, pp. 3322-3326.

Li, Yan-Shuo, et al. "Molecular Sieve Membrane: Supported Metal-Organic Framework with High Hydrogen Selectivity," *Angewandte Chemie*, vol. 49, Issue 3, Jan. 2010, pp. 548-551.
Huang, Aisheng, et al., "Molecular-Sieve Membrane with Hydrogen Permselectivity: ZIF-22 in LTA Topology Prepared with 3-Aminopropyltriethoxysilane as Covalent Linker," *Angewandte Chemie*, vol. 49, Issue 29, Jul. 2010, pp. 4958-4961.
Sun, Yuxiu, et al., "Self-modified fabrication of inner skin ZIF-8 tubular membranes by counter diffusion assisted secondary growth method", *RSC Advances*, Jul. 8, 2014, pp. 1-17 (17 pages in English).
Lee, Moon Joo, et al., "Defect-dependent stability of highly propylene-selective zeolitic-imidazolate framework ZIF-8 membranes", *Journal of Membrane Science*, Jan. 2017, vol. 529, pp. 105-113 (9 pages in English).
European Search Report dated Aug. 30, 2018 in corresponding European Patent Application No. 18163420.5 (14 pages in English).
Korean Office Action dated Sep. 27, 2018 in corresponding Korean Patent Application No. 10-2017-0037504 (2 pages in Korean).
Huang, Aisheng, et al., "Steam-Stable Zeolitic Imidazolate Framework ZIF-90 Membrane with Hydrogen Selectivity through Covalent Functionalization," *Journal of the American Chemical Society*, vol. 132, Issue 44, Oct. 2010, pp. 15562-15564.
Battisti, Anna, et al., "Zeolitic imidazolate frameworks for separation of binary mixtures of $CO_2$, $CH_4$, $N_2$ and $H_2$: A computer simulation investigation," *Microporous and Mesoporous Materials*, vol. 143, Issue 1, Aug. 2011, pp. 46-53.
Krishna, Rajamani, et al., "In silico screening of metal-organic frameworks in separation applications," *Physical Chemistry Chemical Physics*, vol. 13, Issue 22, Jun. 2011, pp. 10593-10616.
Xu, Gengsheng, et al., "Preparation of ZIF-8 membranes supported on ceramic hollow fibers from a concentrated synthesis gel," *Journal of Membrane Science*, vol. 385, Dec. 2011, pp. 187-193.
Huang, Aisheng, et al., "Covalent Post-Functionalization of Zeolitic Imidazolate Framework ZIF-90 Membrane for Enhanced Hydrogen Selectivity," *Angewandte Chemie International Edition*, vol. 50, Issue 21, May 2011, pp. 4979-4982.
Bux, Helge, et al., "Oriented Zeolitic Imidazolate Framework-8 Membrane With Sharp $H_2/C_3H_8$ Molecular Sieve Separation," *Chemistry of Materials*, vol. 23, Issue 8, Mar. 2011, pp. 2262-2269.
Pan, Yichang, et al., "Sharp separation of C2/C3 hydrocarbon mixtures by zeolitic imidazolate framework-8 (ZIF-8) membranes synthesized in aqueous solutions," *Chemical Communications*, vol. 47, Issue 37, Oct. 2011, pp. 10275-10277.
Cravillon, Janosch, et al., "Formate modulated solvothermal synthesis of ZIF-8 investigated using time-resolved in situ X-ray diffraction and scanning electron microscopy," *CrystEngComm*, vol. 14, Issue 2, Jan. 2012, pp. 492-498.
Dong, Xueliang, et al., "Synthesis of zeolitic imidazolate framework-78 molecular-sieve membrane: defect formation and elimination," *Journal of Materials Chemistry*, vol. 22, Issue 36, Aug. 2012, pp. 19222-19227.
Pan, Yichang, et al., "Effective separation of propylene/propane binary mixtures by ZIF-8 membranes," *Journal of Membrane Science*, vol. 390-391, Feb. 2012, pp. 93-98.
Huang, Aisheng, et al., "Organosilica-Functionalized Zeolitic Imidazolate Framework ZIF-90 Membrane with High Gas-Separation Performance," *Angewandte Chemie International Edition*, vol. 51, Issue 42, Oct. 2012, pp. 10551-10555.
Huang, Aisheng, et al. "A highly permeable and selective zeolitic imidazolate framework ZIF-95 membrane for $H_2/CO_2$ separation," *Chemical Communications*, vol. 48, Issue 89, Oct. 2012, pp. 10981-10983.
Fan, Lili, et al., "Electrospinning technology applied in zeolitic imidazolate framework membrane synthesis," *Journal of Materials Chemistry*, vol. 22, Issue 48, Dec. 2012, pp. 25272-25276.
Liu, Qian, et al., "Bio-Inspired Polydopamine: A Versatile and Powerful Platform for Covalent Synthesis of Molecular Sieve Membranes," *Journal of the American Chemical Society*, vol. 135, Issue 47, Nov. 2013, pp. 17679-17682.
Liu, Xinlei, et al., "Improvement of hydrothermal stability of zeolitic imidazolate frameworks," *Chemical Communications*, vol. 49, Issue 80, Oct. 2013, pp. 9140-9142.

(56) References Cited

OTHER PUBLICATIONS

Kwon, Hyuk Taek, et al., "Highly propylene-selective supported zeolite-imidazolate framework (ZIF-8) membranes synthesized by rapid microwave-assisted seeding and secondary growth," *Chemical Communications*, vol. 49, Issue 37, May 2013, pp. 3854-3856.

Shah, Miral N., et al., "An Unconventional Rapid Synthesis of High Performance Metal-Organic Framework Membranes," *Langmuir*, vol. 29, Issue 25, May 2013, pp. 7896-7902.

Huang, Kang, et al., "Growth of a ZIF-8 membrane on the inner-surface of a ceramic hollow fiber via cycling precursors," *Chemical Communications*, vol. 49, Issue 87, Nov. 2013, pp. 10326-10328.

Kwon, Hyuk Taek, et al., "In Situ Synthesis of Thin Zeolitic-Imidazolate Framework ZIF-8 Membranes Exhibiting Exceptionally High Propylene/Propane Separation." *Journal of the American Chemical Society*, vol. 135, Issue 29, Jun. 2013, pp. 10763-10768.

Hara, Nobuo, et al., "Diffusive separation of propylene/propane with ZIF-8 membranes," *Journal of Membrane Science*, vol. 450, Jan. 2014, pp. 215-223.

Gadipelli, Srinivas, et al., "A thermally derived and optimized structure from ZIF-8 with giant enhancement in $CO_2$ uptake," *Energy & Environmental Science*, vol. 7, Issue 7, Jul. 2014, pp. 2232-2238.

Melgar, Victor Manuel Aceituno, et al., "Direct spraying approach for synthesis of ZIF-7 membranes by electrospray deposition," *Journal of Membrane Science*, vol. 459, Jun. 2014, pp. 190-196.

Lee, Taehee, et al., "Thermosensitive Structural Changes and Adsorption Properties of Zeolitic Imidazolate Framework-8 (ZIF-8)," *The Journal of Physical Chemistry C*, vol. 119, Issue 15, Mar. 2015, pp. 8226-8237.

Noh, Seung-Jun, et al., "Synthesis and Characterization of ZIF-7 Membranes by In Situ Method," *Journal of Nanoscience and Nanotechnology*, vol. 15, Issue 1, Jan. 2015, pp. 575-578.

Zhu, Yaqiong, et al., "Highly hydrogen-permselective zeolitic imidazolate framework ZIF-8 membranes prepared on coarse and macroporous tubes through repeated synthesis," *Separation and Purification Technology*, vol. 146, May 2015, pp. 68-74.

James, Joshua B., et al.. "Thermal stability of ZIF-8 membranes for gas separations." *Journal of Membrane Science*, vol. 532, Jun. 2017 (pp. 9-19).

Korean Office Action dated Apr. 27, 2018 in corresponding Korean Patent Application No. 10-2017-0037504 (5 pages in Korean).

European Office Action dated Feb. 18, 2020 in corresponding European Patent Application No. 18 163 420.5 (7 pages in English).

Yang et al., "Deposition of chemically modified α-$Al_2O_3$ particles for high performance ZIF-8 membrane on a macroporous tube," Showcasing research from Jianhua Yang's laboratory, ChemComm, Jan. 1, 2012, pp. 5977-5979, XP055666749.

\* cited by examiner

Conventional ZIF-8 membrane

ZIF-8 membrane synthesized
on porous membrane
with controlled pore size

METHOD OF PREPARING PERM-SELECTIVE POROUS MEMBRANE AND METHOD OF SEPARATING GASES USING POROUS MEMBRANE PREPARED THEREBY

CROSS-REFERENCE TO RELATED APPLICATIONS

This application claims the benefit under 35 USC 119(a) of Korean Patent Application No. 10-2017-0037504 filed on Mar. 24, 2017 in the Korean Intellectual Property Office, the entire disclosure of which is incorporated herein by reference for all purposes.

TECHNICAL FIELD

The present invention relates to a method of preparing a perm-selective porous membrane and a method of separating gases using the porous membrane prepared thereby, and more particularly to a method of preparing a perm-selective porous membrane, which comprises controlling the porous structure of a porous support and producing and filling a fine porous material inside the porous support, thereby forming a perm-selective porous membrane which is used to separate hydrogen produced in a water gas shift reaction, and to a method of separating gases using the porous membrane prepared thereby.

BACKGROUND ART

Most hydrogen is produced as a mixture with carbon dioxide by the reaction of carbon monoxide with water, and this production reaction is known as the water gas shift reaction. This reaction is thermodynamically exothermic, but is carried out at a high temperature of 200 to 500° C. in order to ensure high reaction rates. Because it is an exothermic reaction, the equilibrium shifting to hydrogen at high temperatures is limited. For this reason, membrane reactors have been proposed which can separate produced hydrogen during the reaction. This is because the equilibrium can be shifted more toward production by removing only hydrogen through the reactor wall in equilibrium shift. Because the reaction is carried out at high temperatures as described above, it is essential to secure a technology for ensuring the high thermal stability of a membrane which serves as a wall in the membrane reactor.

A membrane formed of zeolitic imidazolate framework- (hereinafter referred to as "ZIF-8") has a pore size of 0.34 nm and can separate hydrogen (0.289 nm) and carbon dioxide (0.33 nm) from each other by the size difference therebetween. The $H_2/CO_2$ separation ability of ZIF-8 membranes can be found in various literatures (R. Krishna and J. M. van Baten, J. Membr. Sci., 2010, 360, 323-333; Q. Liu et al., J. Am. Chem. Soc., 2013, 135, 17679-17682).

Among methods for synthesizing ZIF-8 membranes, counter diffusion is a method of synthesizing a membrane by controlling the diffusion rate and reaction rate of $Zn^{2+}$ ions and 2-methylimidazole molecules, which constitute ZIF-8. The $Zn^{2+}$ ions are inside a porous support, and the 2-methylimidazole molecules are outside the porous support. Thus, these ions and molecules tend to diffuse in opposite directions due to the difference in concentration therebetween. The two materials meet each other on the porous support surface to form ZIF-8 grains, thereby synthesizing a membrane. The ZIF-8 membrane synthesized as described above shows high separation coefficients in propylene/propane separation (H. T. Kwon and H. K. Jeong, J. Am. Chem. Soc., 2013, 135, 10763-10768).

Currently, ZIF membrane technology is being developed in the direction of suggesting new membrane synthesis methods. For actual application to the water gas shift reaction, the thermal stability of the membrane should be confirmed and secured through $H_2/CO_2$ measurement at high temperatures.

Accordingly, the present inventors have made extensive efforts in order to solve the above-described problems, and as a result, have found that when a membrane is produced inside a hierarchically structured porous support by the counter diffusion method. The resulting membrane will have an increased stability against physical changes caused by external impact or the like, and will not be exposed directly to high-temperature gases, unlike a conventional membrane that shows low thermal stability due to direct contact with high-temperature $H_2$ and $CO_2$ gases, and thus can ensure higher thermal stability than the conventional membrane, thereby completing the present invention.

SUMMARY OF THE INVENTION

It is an object of the present invention to provide a porous membrane which is produced inside a porous support so as to have an increased stability against physical changes caused by external impact or the like and a high thermal stability, and a method of preparing the porous membrane.

Another object of the present invention is to provide a method of separating hydrogen from a mixed gas of $H_2$ and $CO_2$ using the membrane.

To achieve the above objects, the present invention provides a method of preparing a porous membrane, comprising: (a) synthesizing a hierarchically structured porous support by coating particles having pores smaller than those of the porous support on a porous support; and (b) synthesizing a membrane in which zeolitic imidazolate frameworks (ZIFs) are formed inside the hierarchically structured porous support by performing counter diffusion The present invention also provides a porous membrane which is prepared by the method of claim 1, wherein ZIFs are formed inside a hierarchically structured porous support having pores of 2 to 50 nm formed by coating ceramic particles on one side of a ceramic support having pores of 50 to 1000 nm, the porous membrane has a thickness of 0.1 to 500 μm.

The present invention also provides a method of separating hydrogen from a mixed gas of $H_2$ and $CO_2$ or syngas using the above-described porous membrane.

BRIEF DESCRIPTION OF THE DRAWINGS

The patent or application file contains a least one drawing executed in color. Copies of this patent or patent application publication with color drawing(s) will be provided by the Office upon request and payment of the necessary fee FIG. 1 schematically shows a ZIF-8 membrane synthesized using a conventional porous support (left) and a ZIF-8 membrane synthesized using a hierarchically structured porous membrane (right) according to an example of the present invention.

BEST MODE FOR CARRYING OUT THE INVENTION

Figure 1:
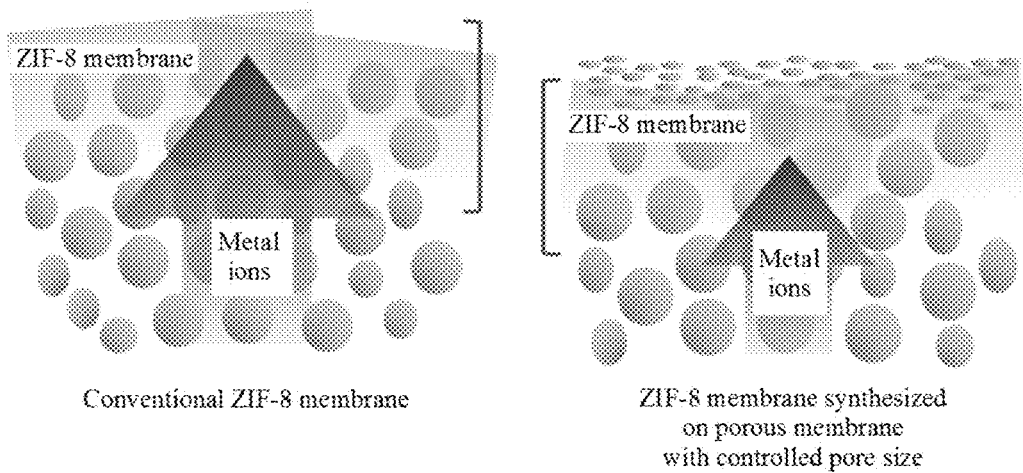

Unless defined otherwise, all the technical and scientific terms used herein have the same meaning as those generally understood by one of ordinary skill in the art to which the invention pertains. Generally, the nomenclature used herein and the experiment methods, which will be described below, are those well known and commonly employed in the art.

In the present invention, alumina having a pore size different from that of a conventional alumina porous support is coated on the conventional alumina porous support, thereby synthesizing a hierarchically structured porous support. Using the hierarchically structured porous support, a ZIF-8 membrane is synthesized by the counter diffusion method. Namely, when a porous support adsorbed with $Zn^{2+}$ ions by immersion in a $Zn^{2+}$ ion solution is immersed in a 2-methylimidazole solution, the $Zn^{2+}$ ions are diffused from the support to the outside, and the 2-methylimidazole is diffused from the bulk solution toward the support. Thus, the two materials meet each other to form crystals. Here, the $Zn^{2+}$ ion and the 2-methylimidazole have high reactivity, and thus when they meet each other, they form crystals almost at the same time. In the case of a ZIF-8 membrane synthesized using a conventional support having only large pores, $Zn^{2+}$ ions are diffused quickly to the outside and meet 2-methylimidazole, and thus most of the membrane is formed on the top of the support. In the present invention, a membrane is formed inside a porous support by controlling the pore size of the porous support to reduce the diffusion rate of $Zn^{2+}$ ions.

Additionally, the diffusion rate of $Zn^{2+}$ metal ions decreases so that an increased amount of the $Zn^{2+}$ metal ions can react with 2-methylimidazole inside the porous support, thereby forming a continuous membrane. A conventional membrane is mostly synthesized on the top of a support, whereas a continuous membrane of the present invention can be formed while the inside of a porous support is filled, and the thickness of the membrane can be controlled according to the degree of filling the pores.

Therefore, an aspect of the present invention is directed to a method of preparing a porous membrane, comprising: (a) synthesizing a hierarchically structured porous support by coating particles having pores smaller than those of the porous support on a porous support; and (b) synthesizing a membrane in which zeolitic imidazolate frameworks (ZIFs) are formed inside the hierarchically structured porous support by performing counter diffusion The step of (b) may comprise immersing the synthesized hierarchically structured porous support of step (a) in a zinc salt solution or a cobalt salt solution, thereby adsorbing $Zn^{2+}$ or $Co^{2+}$ on the porous support, and then immersing the porous support adsorbed with $Zn^{2+}$ or $Co^{2+}$ in an imidazole or imidazole derivative solution, thereby forming $Zn^{2+}$ or $Co^{2+}$ imidazole crystals inside the porous support.

The hierarchically structured porous support may have 2 to 50 nm sized-pores, preferably 3 to 10 nm sized-pores, formed on one side of a wall having 50 to 1000 nm sized-pores, preferably 100 to 500 nm sized-pores.

The particles having pores smaller than those of the porous support in the step of (a), have a pore size of 2 to 50 nm, preferably 3 to 10 nm. For example, the particles may be at least one selected from the group consisting of $\alpha$-alumina, $\gamma$-alumina, silica, glass, mullite, zirconia, titania, yttria, ceria, vanadia, silicone, stainless steel, calcium oxide, phosphor oxide, and mixtures thereof. Preferably, the particles that can be used in the present invention may be $\alpha$-alumina or $\gamma$-alumina, but is not limited thereto.

The zinc salt may be at least one selected from the group consisting of zinc nitrate, zinc acetate, zinc chloride, zinc sulfate, zinc bromide, and zinc iodide.

The cobalt salt may be at least one selected from the group consisting of cobalt nitrate, cobalt acetate, cobalt chloride, cobalt sulfate, cobalt bromide, and cobalt iodide.

The imidazole or imidazole derivative may be at least one selected from the group consisting of benzimidazole, 2-methylimidazole, 4-methylimidazole, 2-methylbenzimidazole, 2-nitroimidazole, 5-nitrobenzimidazole and 5-chlorobenzimidazole. Preferably, the imidazole or imidazole derivative that can be used in the present invention may be 2-methylimidazole, but is not limited thereto.

The zinc salt solution, the cobalt salt solution, or the imidazole or imidazole derivative solution may be dissolved in at least one solvent selected from the group consisting of methanol, ethanol, propanol, iso-propanol, tert-butanol, n-butanol, methoxyethanol, ethoxyethanol, dimethylacetate-amide, dimethylformamide, N-methyl-2-pyrrolidone (NMP), formic acid, nitromethane, acetic acid and distilled water.

The porous membrane may have a thickness of 0.1 to 500 µm, preferably 5 to 100 µm, more preferably 5 to 80 µm.

The size of pores in ZIF-8 is about 0.34 nm, which is larger than hydrogen (0.289 nm) and is slightly larger than carbon dioxide (0.33 nm). Considering that the diffusion rate of molecules changes very sensitively to the size of fine pores, $H_2/CO_2$ separation based on the difference in diffusion rate through a ZIF-8 membrane may be performed. Because $H_2/CO_2$ separation is suitable for overcoming low conversion rate which is the problem of the water gas shift reaction, it is essential to ensure the high-temperature stability of a membrane. This high-temperature stability can be ensured by synthesizing the membrane inside a porous support. In addition, although this membrane is not applicable as a membrane reactor in the water gas shift reaction, it may be used as a membrane to separate a high-temperature $H_2/CO_2$ mixture which is discharged from a water gas shift reactor.

FIG. 1 is a schematic view showing that a ZIF-8 membrane can be synthesized inside a porous support by controlling the pore size of the porous support.

Technology that can control the pore size of a porous support so as to control the diffusion rate of metal ions loaded on the support, thereby controlling the active site of the membrane. Since the pore size of the porous support is determined by $\gamma$-$Al_2O_3$ to be coated thereon, the pore size of the support may be controlled by selecting suitable coating conditions. Thus, the $H_2/CO_2$ separation factor at high temperatures can be ensured by controlling the active site of the membrane. In addition, the physical stability of the membrane may also be increased by controlling the active site of the membrane. Furthermore, when the diffusion rate of metal ions is controlled so as to increase the amount of metal ions that react inside the support, the thickness of the membrane can become thicker, thereby ensuring a higher $H_2/CO_2$ separation factor.

ZIF-8 membranes are highly suitable as $H_2$ selective walls in membranes reactors used for water gas shift reactions because of their efficient molecular sieving properties that favor $H_2$ transport, coupled with their high thermal stability and processability. In the present invention, an in-situ counter diffusion method is used to prepare ZIF-8 membranes. Zn sources, already placed inside a porous support, are allowed to diffuse out and react with the 2-methylimidazole (mim) ligands in the bulk phase. Because the reaction rates between the Zn source and the mim ligand are very high, their diffusion rates play a key role in determining the final properties of the membranes. To control the diffusion rate, a hierarchically structured support, i.e., a $\gamma$-$Al_2O_3$ layer-coated $\alpha$-$Al_2O_3$ disc ($\gamma$-/$\alpha$-$Al_2O_3$ disc), is used in addition to an intact $\alpha$-$Al_2O_3$ disc. ZIF-8 membranes in the $\alpha$-$Al_2O_3$ disc (membrane ZIF-8_$\alpha$) are primarily formed on top similar to a conventional supported-membrane, whereas those in the $\gamma$-/$\alpha$-$Al_2O_3$ disc (membrane ZIF-8_$\gamma\alpha$) are embedded inside the modified support. As desired, the embedded membrane ZIF-8_$\gamma\alpha$ shows marked $H_2$ separation performance with a maximum $H_2/CO_2$ separation factor (SF) of ~9.8±0.9 at 250° C. (vs. a maximum $H_2/CO_2$ SF of ~8.0±1.1 for membrane ZIF-8_$\alpha$). Although both type membranes persist at 200 and 250° C. for up to 72 hours, at a higher temperature of 300° C., the membrane performance starts deteriorating after ~2 hours and ~10 hours for membranes ZIF-8_$\alpha$ and ZIF-8_$\gamma\alpha$, respectively. This indicates that the $\gamma$-$Al_2O_3$ layer serves as a protective layer for preserving the performance of the embedded ZIF-8 membrane. Their performance is completely degraded due to the eventual conversion of ZIF-8 into ZnO phases.

In addition, in an example of the present invention, the hydrogen separation ability ($H_2/CO_2$ separation) of each of a ZIF-8 membrane synthesized on a conventional porous support (for convenience, referred to as membrane A) and a ZIF-8 membrane synthesized in a hierarchically structured support (for convenience, referred to as membrane B) was measured at 200° C., 250° C. and 300° C. for 3 days. As a result, it was shown that both membrane A and membrane B maintained their hydrogen separation ability at 200° C. and 250° C. for 3 days. Furthermore, it was shown that at 300° C., membrane A maintained its hydrogen separation ability for 2 hours, and membrane B maintained its hydrogen separation ability. Meanwhile, the surface of each of membrane A and membrane B was ground with sand paper, and the hydrogen separation ability of each membrane was measured. As a result, it was found that membrane A almost lost its hydrogen separation ability after grinding with sand paper, whereas membrane maintained its hydrogen separation ability even after grinding with sand paper.

Therefore, an another aspect of the present invention is directed to a porous membrane which is prepared by the method of the present invention, wherein ZIFs are formed inside a hierarchically structured porous support having pores of 2 to 50 nm formed by coating ceramic particles on one side of a ceramic support having pores of 50 to 1000 nm, the porous membrane has a thickness of 0.1 to 500 µm.

The porous membrane according to a preferred embodiment of the present invention can allow ZIFs to be formed inside a hierarchically structured porous support having 2 to 50 nm sized-pores formed by coating ceramic particles on one side of a ceramic support having 50 to 1000 nm sized-pores, and can have a thickness of 5 to 80 µm.

In another aspect, the present invention is directed to a method of separating hydrogen from a mixed gas of $H_2$ and $CO_2$ or syngas using the above-described porous membrane.

The method of separating hydrogen from a mixed gas of $H_2$ and $CO_2$ or syngas using the above-described porous membrane may be performed at high temperature, specifically, at a temperature of 100 to 500° C., preferably 200 to 300° C.

Hereinafter, the present invention will be described in further detail with reference to examples. It will be obvious to a person having ordinary skill in the art that these examples are for illustrative purposes only and are not to be construed to limit the scope of the present invention.

Example 1: Synthesis of ZIF-8 Membrane Using Hierarchically Structured Porous Support A hierarchically structured support was synthesized by coating $\gamma$-$Al_2O_3$ on a conventional porous support (pore size: 150 nm), and SEM observation confirmed that the support had a hierarchical structure. XRD observation confirmed that the $\gamma$-$Al_2O_3$ phase appeared, and nitrogen adsorption at 77 K indicated that the hierarchically structured support had a pore size of about 5 nm. A ZIF-8 membrane was synthesized using the hierarchically structured support and analyzed by SEM and XRD. A ZIF-8 membrane was synthesized inside the porous support by controlling the pore size of the porous support to control the diffusion rate of $Zn^{2+}$ ions, and the synthesized membrane was analyzed by SEM, XRD and EDX. In addition, in order to examine how the mesopores of the hierarchically structured support were filled with ZIF-8 particles, nitrogen adsorption at 77 K was performed. As a result, it was quantitatively determined that most of the ZIF-8 membrane was synthesized inside the support.

Preparation Example 1: Preparation of $\alpha$-$Al_2O_3$ Disc and $\gamma$-/$\alpha$-$Al_2O_3$ Disc An $\alpha$-$Al_2O_3$ disc (21 mm in diameter and 2 mm in thickness) was prepared according to a method disclosed in a literature (J. Choi et al., Adsorption, 2006, 12, 339-360), and a $\gamma$-/$\alpha$-$Al_2O_3$ disc was prepared by coating a boehmite sol, prepared according to a conventional method, on top of a bare $\alpha$-$Al_2O_3$ disc. Initially, alumina-tri-sec-butoxide (ATSB, 97%, Sigma-Aldrich) was mixed with deionized (DI) water pre-heated to 90° C. and the mixture was then stirred at 90° C. for 1 hour under reflux. After that, HCl (35 wt % in water, DAEJUNG) was added to the mixture and further stirred for 1 day under reflux so as to be homogenized. The final composition of the prepared sol was 1 ATSB: 0.07 HCl: 100 $H_2O$. The prepared boehmite sol was stored in a refrigerator (about 5° C.) and used continually for coating $\gamma$-$Al_2O_3$ layers onto $\alpha$-$Al_2O_3$ discs. The $\gamma$-layer was coated on the polished surface of the $\alpha$-$Al_2O_3$ disc by placing the boehmite sol in contact with the surface for 10 seconds, and the remaining sol on the $\alpha$-$Al_2O_3$ disc was further wiped away with a paper towel. The $\gamma$-/$\alpha$-$Al_2O_3$ disc was dried at room temperature overnight and calcined at 600° C. for 3 hours with a heating ramp rate of 0.5° C./min under air flow of 200 mL/min (Pluskolab, model: CRF-M20-UP).

Preparation Example 2: Preparation of ZIF-8 Membrane by Counter Diffusion Method A ZIF-8 membrane was prepared by adopting the counter diffusion method disclosed in a literature (H. T. Kwon, H. K. Jeong, J. Am. Chem. Soc., 2013, 135, 10763-10768) with a minor difference in the horizontal position of the disc. In brief, the $\alpha$-$Al_2O_3$ disc or the $\gamma$-/$\alpha$-$Al_2O_3$ disc was immersed overnight in 0.18 M of Zn solution ($ZnCl_2$ (99%, Sigma-Aldrich)). Then, the support that was already saturated by the zinc source was placed horizontally at the bottom of the Teflon-lined autoclave where the mim solution (1.58 M mim (98%, Sigma-Aldrich) in methanol that included sodium formate (99%, Sigma-Aldrich) was already contained. The molar ratio of sodium formate to mim was 0.1. The sealed autoclave was placed in a pre-heated oven at 120° C. and the reaction proceeded for 4 hours. After the reaction, the ZIF-8 membrane was rinsed with methanol and dried in ambient conditions. For convenience, the resulting ZIF-8 membranes were referred to as membranes ZIF-8_$\alpha$ and ZIF-8_$\gamma\alpha$, respectively, where $\alpha$ and $\gamma\alpha$ represent the pure $\alpha$-$Al_2O_3$ disc or the composite $\gamma$-/$\alpha$-$Al_2O_3$ disc support, respectively. The as-synthesized ZIF-8 membrane was further activated by using a pre-heated oven at 160° C. in ambient air overnight.

Characterizations

Scanning electron microscopy (SEM) images and energy dispersive X-ray spectroscopy (EDX) data were acquired using a field emission scanning electron microscope (FE-SEM, Hitachi S-4800). X-ray diffraction (XRD) patterns of the samples were obtained using a Rigaku Model D/Max-2500V/PC diffractometer (Japan) with Cu $K_\alpha$ radiation (40 kV, 100 mA, $\lambda$=0.154 nm). As a reference, the crystallographic information file (CIF) of ZIF-8 structures (deposit no. 602542) was acquired from the Cambridge Crystallographic Data Centre (CCDC, www.ccdc.cdm.ac.uk), and the corresponding XRD pattern was generated with Mercury software (CCDC, www.ccdc.cdm.ac.uk). The water droplet contact angle was measured at room temperature with an optical microscope (General Phoenix 300, Surface Electro Optics). The pore size distributions and porosities of the two kinds of supports, the $\alpha$-$Al_2O_3$ disc and the $\gamma$-/$\alpha$-$Al_2O_3$ disc were obtained by using an automatic mercury porosimeter (AutoPore IV 9520, Micromeritics). The specific surface areas of the supports were estimated by the Brunauer-Emmett-Teller (BET) method and the pore size distributions were calculated by using the BJH method. The micropore areas of the ZIF-8 membrane were estimated via the t-plot method. The specific surface area, pore size distribution, and micropore area were determined from the $N_2$ adsorption isotherm (ASAP 2020, Micromeritics) at 77 K. Samples were degassed at 350° C. for the $\alpha$-$Al_2O_3$ and $\gamma$-/$\alpha$-$Al_2O_3$ disc, and at 200° C. for membranes ZIF-8_$\alpha$ and ZIF-8_$\gamma\alpha$. The $H_2$ and $CO_2$ permeation rates across the ZIF-8 membranes were measured in Wicke-Kallenbach mode with total feed and permeate side pressures of 1 atm. For the $H_2$/$CO_2$ permeation measurement up to 200° C., Viton O-rings were used to seal the permeation cell, whereas for the measurement up to 300° C. and long-term thermal stability tests at 200° C., 250° C., and 300° C., Kalrez O-rings were used for appropriate acquisition of the permeation rates. An approximately 100 mL/min total flow rate with 50 kPa $H_2$/50 kPa $CO_2$ was fed to the ZIF-8 membrane, while the permeate side was swept by an approximately 100 mL/min He flow. The $H_2$ and $CO_2$ permeates in the permeate side were carried by the He sweep gas to an on-line gas chromatograph (GC, YL Instrument, 6500GC System), and prior to the GC, 5 mL/min of $CH_4$ was mixed into the permeate stream to serve as an internal standard.

For detection, a pulsed discharge ionization detector (PDD) was used to quantify the composition of $H_2$ and $CO_2$ in the permeate stream because a thermal conductivity detector (TCD), used generally for characterizing permanent gases, could not distinguish He/$H_2$ and Ar/$CO_2$ pairs, apparently due to their similar thermal conductivities.

Figure 2:
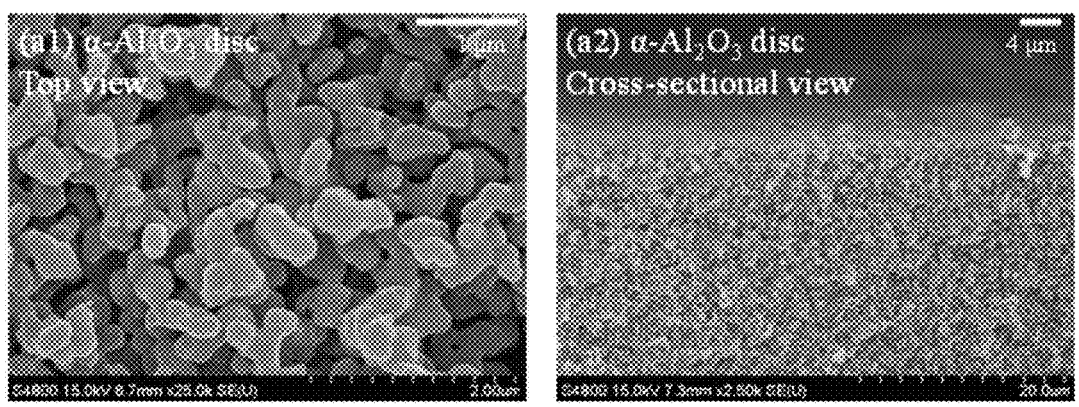
FIG. 2 shows SEM images of an (a1)-(a2) $\alpha$-$Al_2O_3$ disc and (b1)-(b2) $\gamma$-/$\alpha$-$Al_2O_3$ disc according to an example of the present invention.
Figure 2:
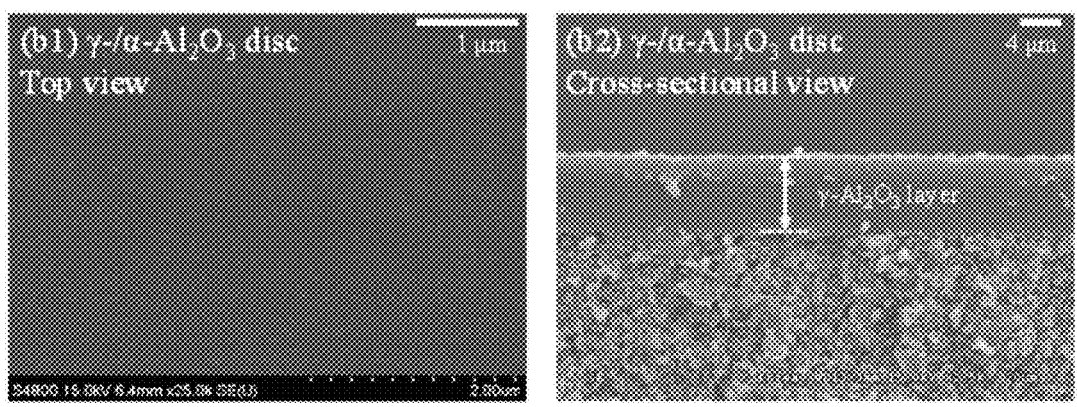
Figure 3:
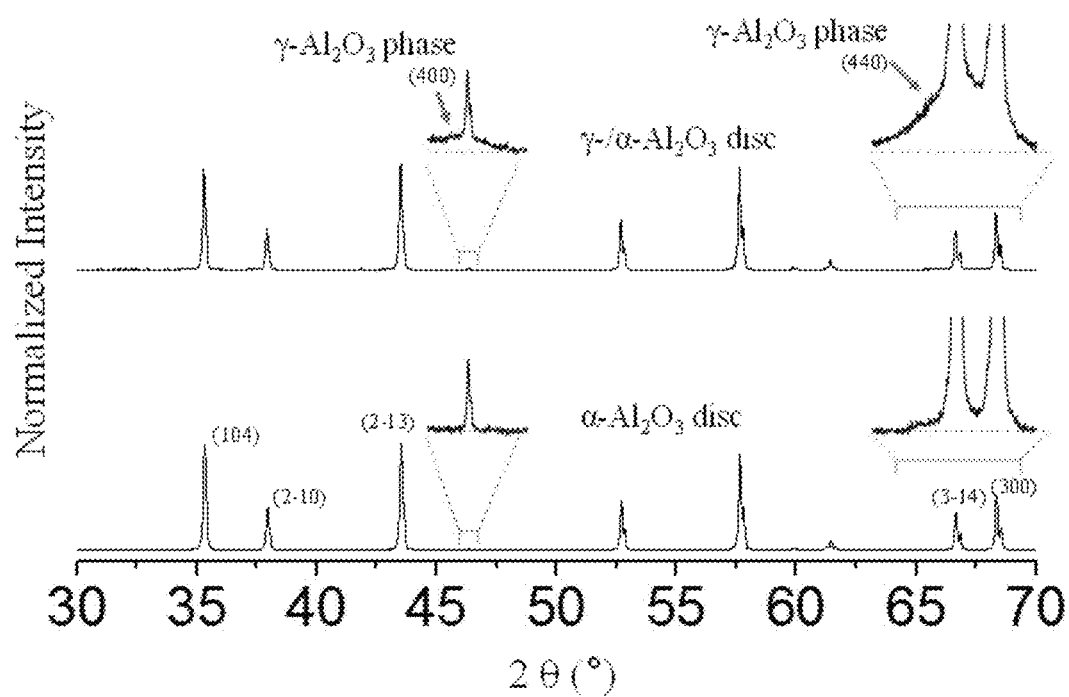
FIG. 3 shows XRD patterns of an $\alpha$-$Al_2O_3$ disc (bottom) and $\gamma$-/$\alpha$-$Al_2O_3$ disc (top) according to an example of the present invention.

FIG. 2 shows the top view and cross-sectional view SEM images of both $\alpha$-$Al_2O_3$ and $\gamma$-/$\alpha$-$Al_2O_3$ discs. The grains (about 250 to 700 nm) that comprise the $\alpha$-$Al_2O_3$ disc had an irregular shape (FIG. 2($a$1)), while those of the smooth $\gamma$-$Al_2O_3$ layer in the $\gamma$-/$\alpha$-$Al_2O_3$ disc, which is supposed to have micropores on the order of 1 nm, were too small to be recognized under SEM resolution (FIG. 1($b$1)). The cross-sectional view SEM image of the $\gamma$-/$\alpha$-$Al_2O_3$ disc in FIG. 2($b$2) reveals the formation of an 8 μm thick $\gamma$-$Al_2O_3$ layer on top of the $\alpha$-$Al_2O_3$ disc (FIG. 1($a$2)), constituting an asymmetric structure. In addition, FIG. 3 confirms the formation of the $\gamma$-$Al_2O_3$ layer. The mercury porosimetry characterization in Table 1 did not distinguish any remarkable discrepancies between the two types of supports, seemingly because the 2,000 μm thick $\alpha$-$Al_2O_3$ disc vastly outweighed the 8 μm thick $\gamma$-$Al_2O_3$ layer in the measurement. Nevertheless, the SEM characterization shown in FIG. 1 confirmed the definite difference on the top surface between the $\alpha$-$Al_2O_3$ disc and the $\gamma$-/$\alpha$-$Al_2O_3$ disc.

TABLE 1

| Support | Pore size (nm) | Porosity (%) |
|---|---|---|
| α-Al$_2$O$_3$ disc | 151.1 | 40.3 |
| γ-/α-Al$_2$O$_3$ disc | 154.7 | 40.7 |

Figure 4:
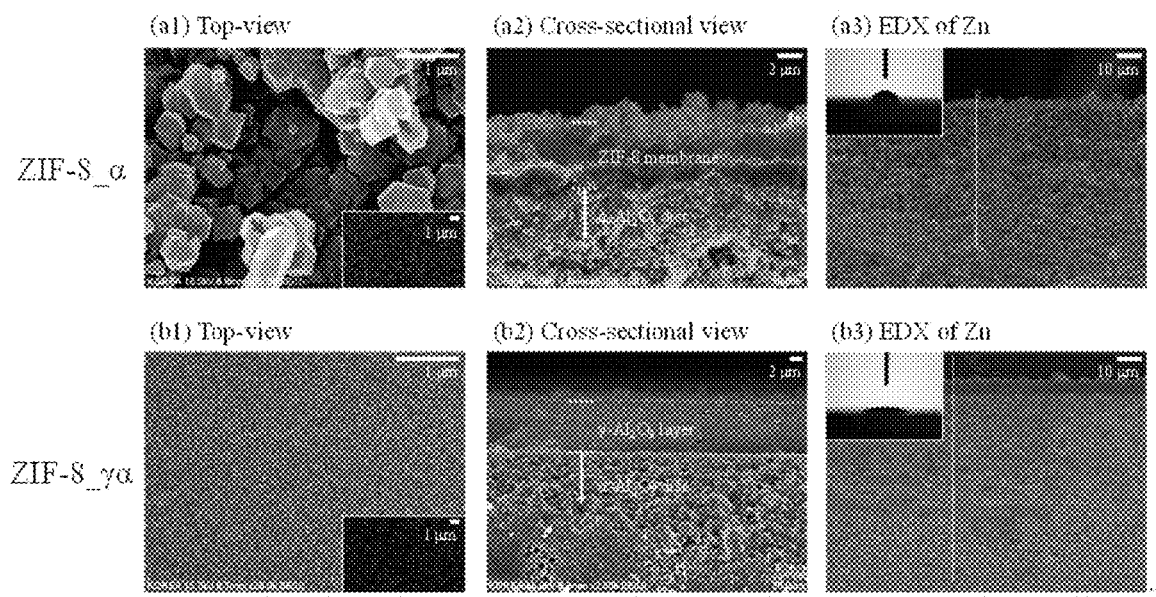
FIG. 4 shows cross-sectional SEM images of membranes (a1)-(a2) ZIF-8_$\alpha$ and (b1)-(b2) ZIF-8_$\gamma\alpha$ according to an example of the present invention.

FIG. 4 shows the morphology of membranes ZIF-8_α and ZIF-8_γα. It appears that membrane ZIF-8_α was composed of well inter-grown ZIF-8 grains with a size of about 200 to 300 nm, whereas some larger ZIF-8 particles, indicated by red arrows in the figure, were widespread throughout the surface (FIG. 4(a1)). The degree of particle aggregation was comparable to that observed in the ZIF-8 membrane prepared by the CD method disclosed in a literature (H. T. Kwon, H. K. Jeong, J. Am. Chem. Soc., 2013, 135, 10763-10768). The total thickness of membrane ZIF-8_α was estimated to be 5 µm including about 2 µm thick ZIF-8 phases formed below the surface (FIG. 4(a2)). This indicates that the reaction zone where the two reactants meet and further react was likely to originate below the surface of the α-Al$_2$O$_3$ disc (H. T. Kwon, H. K. Jeong, J. Am. Chem. Soc., 2013, 135, 10763-10768). In addition, the EDX result (FIG. 4(a3)), which is effective for designating the distribution of Zn atoms, also indicates that ZIF-8 membranes were primarily fabricated on the top of the α-Al$_2$O$_3$ disc, whereas some ZIF-8 grains were present inside the α-Al$_2$O$_3$ disc. Finally, the contact angle measurement of a water droplet on membrane ZIF-8_α supported the formation of hydrophobic ZIF-8 phases on the α-Al$_2$O$_3$ disc, as the corresponding contact angle of about 71° was comparable to the reported value (about 60°) of the self-supported ZIF-8 pellets (X. Liu et al., Chem. Commun., 2013, 49, 9140-9142). In contrast to membrane ZIF-8_α, at a first glance, the SEM images in FIG. 4(b1)-4(b2) suggest that membrane ZIF-8_γα failed to grow after applying the CD method. However, a comparison of the top view SEM images in FIGS. 2(b1) and 4(b1) reveals a definite discrepancy in the surface morphology of the γ-/α-Al$_2$O$_3$ disc and membrane ZIF-8_γα. Tiny grains, seemingly reflected by noisy features, were generated throughout the surface after conducting the CD method. In fact, the EDX analysis on membrane ZIF-8_γα (FIG. 4(b3)) supports that the ZIF-8 phase rarely existed on the surface, and instead the ZIF-8 phase was distributed widely along the film thickness of the γ-/α-Al$_2$O$_3$ disc. Furthermore, the contact angle of a water droplet on membrane ZIF-8_γα was much smaller, approximately 15°, indicating that ZIF-8 grains were not predominantly formed above the surface of the γ-/α-Al$_2$O$_3$ disc.

Figure 5:
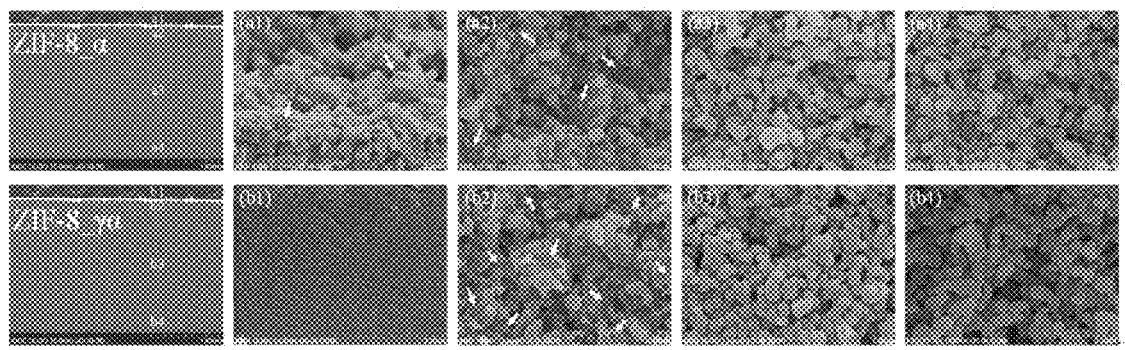
FIG. 5 shows cross-sectional SEM images at a low magnification ($1^{st}$ column) and taken in the four support positions (approximately indicated in the low magnification SEM image in the $1^{st}$ column) ($2^{nd}$ to $5^{th}$ columns) for membranes (a1)-(a4) ZIF-8_$\alpha$ and (b1)-(b4) ZIF-8_$\gamma\alpha$ according to an example of the present invention.

In an effort to investigate the location of ZIF-8 grains in both membranes in a rigorous way, cross-sectional view SEM images as well as EDX results were obtained at four different positions along the membrane thickness (right above and below the surface (top), middle, and bottom) (FIG. 5 and Table 2). In membrane ZIF-8_α, most grains were formed right above or below the top surface of the α-Al$_2$O$_3$ disc (FIGS. 5(3a1) to 5(a4)), though some ZIF-8 grains that filled the pores were sporadically present, as indicated by white arrows in FIG. 5(a2). On the contrary, in membrane ZIF-8_γα, most ZIF-8 grains grew to fill the pores inside the α-Al$_2$O$_3$ disc, but near the interface between the γ-Al$_2$O$_3$ layer and α-Al$_2$O$_3$ disc, thus forming a continuous film (FIGS. 5(b1) to 5(b4)). These grains were primarily located right below the interface, though their existence in the γ-Al$_2$O$_3$ layer could not be completely ruled out due the SEM resolution limit. In fact, similar ratios (about 8.5%) of Zn to Al near the interface and in the γ-Al$_2$O$_3$ layer indicate that ZIF-8 grains were located in the pores of the γ-Al$_2$O$_3$ layer (Table 2). Finally, it was also noted that the formation of ZIF-8 grains in the middle and bottom parts of both types of supports was negligible.

TABLE 2

| Position of α-Al$_2$O$_3$ disc | Membrane ZIF-8_α Weight ratio (Zn (wt %)/Al (wt %)) | Membrane ZIF-8_γα Weight ratio (Zn (wt %)/Al (wt %)) |
|---|---|---|
| Top | 7.7 ± 4.5 | 8.5 ± 1.3 (γ-Al$_2$O$_3$ layer) 8.5 ± 1.1 |
| Middle | 0 | 0 |
| Bottom | 0 | 0 |

Figure 6:
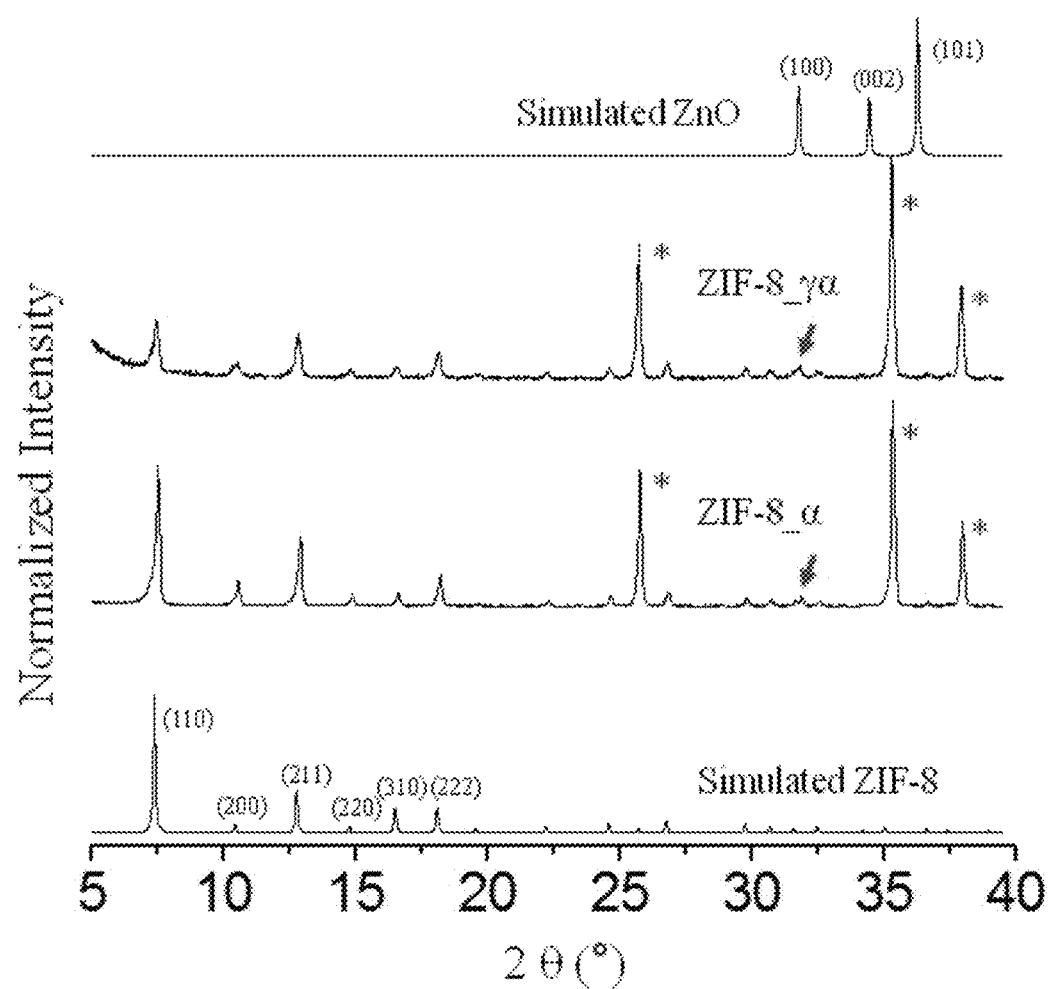
FIG. 6 shows XRD patterns for membranes ZIF-8_$\alpha$ and ZIF-8_$\gamma\alpha$ with simulated XRD patterns of ZIF-8 (bottom) and ZnO (top) added as references, according to an example of the present invention.

The XRD patterns shown in FIG. 6 confirm the existence of the ZIF-8 phase in both membranes ZIF-8_α and ZIF-8_γα. In addition, these patterns indicate that both membranes were randomly oriented. At first glance, the XRD intensities suggest that the amount of ZIF-8 phases in membrane ZIF-8_γα was much lower than that in membrane ZIF-8_α. However, the weight gains after membrane synthesis were similar for both cases; about 11 mg for membrane ZIF-8_α and about 12 mg for membrane ZIF-8_γα (Table 3). Considering the X-ray source could penetrate a finite depth into the sample, it appears that the γ-Al$_2$O$_3$ layer inhibited, and thus decreased the intensity of the XRD peak corresponding to the α-Al$_2$O$_3$ disc. In addition, the present inventors could not rule out the possibility that the ZIF-8 grains in membrane ZIF-8_γα primarily existed deeper inside the α-Al$_2$O$_3$ disc support, as shown in the cross-sectional view SEM images (FIG. 5). Detailed analysis on the minor ZnO phase in the membranes ZIF-8_α and ZIF-8_γα (indicated by red arrows in FIG. 4) was further performed.

TABLE 3

Estimated weights of the ZIF-8 phase in membranes ZIF-8_α and ZIF-8_γα obtained by weighing samples before and after membrane synthesis and by comparing micropore areas (estimated from the t-plot method).

| Samples | Estimated weight of ZIF-8 phase (mg) obtained by weighing samples measured before and after membrane synthesis | Estimated weight of ZIF-8 phase (mg) obtained by comparing the microporous surface areas |
|---|---|---|
| ZIF-8_α | 11 ± 0.1 | 8.0 |
| ZIF-8_γα | 12 ± 0.1 | 8.4 |

Despite the rigorous characterization via XRD, SEM, and EDX analyses, the present inventors could not determine the presence of the ZIF-8 grains in the γ-Al$_2$O$_3$ layer. In an unprecedented approach to locate the ZIF-8 grains in the γ-Al$_2$O$_3$ layer, the present inventors, for the first time, measured the N$_2$ adsorption isotherms of the supports and supported membranes at 77 K; the bare disc supports (α-Al$_2$O$_3$ and γ-/α-Al$_2$O$_3$ discs) and the supported ZIF-8 membranes (ZIF-8_α and ZIF-8_γ) (FIGS. 7a and 7d). Their corresponding specific microporous surface areas (Table 4) and pore size distributions (FIGS. 5b to 5c and 7e to 7f) were further evaluated to identify and quantify the ZIF-8 grains in both ZIF-8 membranes. As a reference, the specific microporous surface area of ZIF-8 powder, synthesized in the same methanol medium, was adopted here (T. Lee et al., *J. Choi, J. Phys. Chem. C,* 2015, 119, 8226-8237). Specifically, the comparison between the microporous surface areas of the disc support and its supported membrane allowed for estimating the weight of ZIF-8 grains in membranes ZIF-8_α and ZIF-8_γα. The estimates of 8.0 mg for ZIF-8_α and 8.4 mg for ZIF-8_γα were in a good agreement with the measured values of 11 mg for ZIF-8_α and 12 mg for ZIF-8_γα (Table 3), which were obtained by weighing before and after membrane synthesis.

TABLE 4

|  | BET surface area (m²/g) | External surface area (m²/g) | Micropore surface area (m²/g) |
|---|---|---|---|
| α-Al₂O₃ disc | 3.88 ± 0.008 | 3.84 | 0.036 |
| γ-/α-Al₂O₃ disc | 4.30 ± 0.008 | 2.92 | 0.96 |
| ZIF-8_α | 10.06 ± 0.04 | 2.13 | 7.92 |
| ZIF-8_γα | 10.56 ± 0.04 | 2.39 | 8.17 |
| ZIF-8 powder[1] | 1643.3 ± 9.8 | 65.6 | 1577.7 |

Note[1]
T. Lee et al., J. Choi, J. Phys. Chem. C, 2015, 119, 8226-8237.

Figure 7:
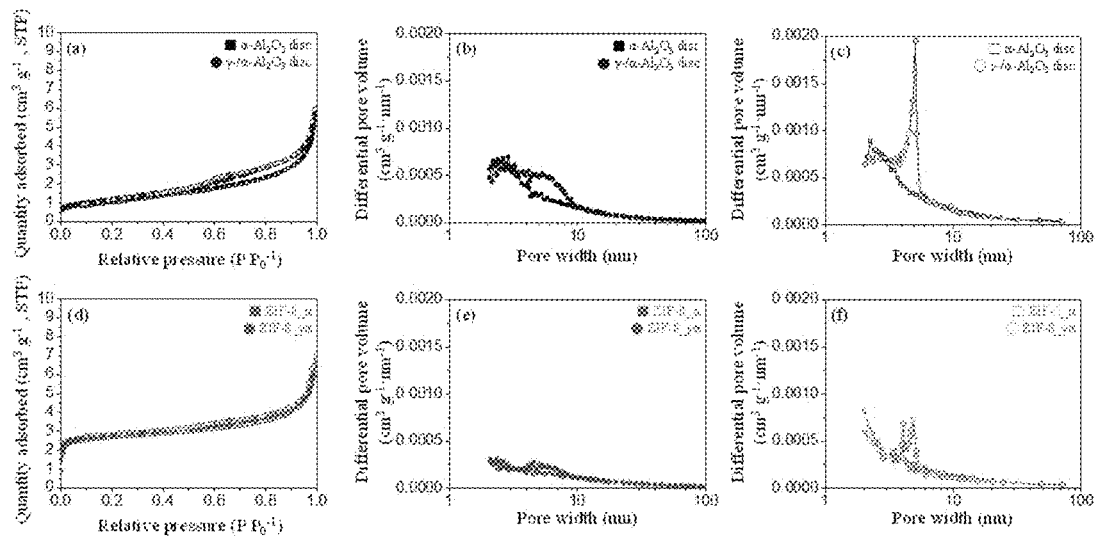
FIG. 7 shows $N_2$ adsorption isotherms at 77 K and pore size distribution of supports (the $\alpha$-$Al_2O_3$ and $\gamma$-/$\alpha$-$Al_2O_3$ discs), and supported membranes (ZIF-8_$\alpha$ and ZIF-8_$\gamma\alpha$) with the BJH analysis according to an example of the present invention. (a) and (d): $N_2$ adsorption isotherms, (b) and (e): BJH adsorption branch, and (c) and (f): BJH desorption branch.

FIGS. 7(*b*) and 7(*c*) reveal the existence of mesopores in the range of about 3 to 10 nm in the γ-/α-Al₂O₃ disc, primarily due to the mesoporous γ-Al₂O₃ layer compared to the α-Al₂O₃ disc. In particular, BJH analysis from the desorption points clearly reveals the presence of mesopores of approximately 5 nm, indicating a regular bottleneck formation in the γ-Al₂O₃ layer. In addition, FIGS. 7(*e*) and 7(*f*) show the reduced mesopores in ZIF-8_γα, apparently attributable to the marked mesopore filled by the ZIF-8 grains, whereas no change was observed in the mesoporous regime between the α-Al₂O₃ disc and membrane ZIF-8_α. The accumulated mesoporous volume for membrane ZIF-8_γα relative to that for the γ-Al₂O₃ layer in the γ-/α-Al₂O₃ disc (FIG. 5) suggests that the extent of ZIF-8 grains filling mesopores in the γ-Al₂O₃ layer was as high as about 70%. Considering the specific mesopore volume (estimated to be about $5 \times 10^{-4}$ cm³·g⁻¹) and density (about 4 g·cm⁻³) of the γ-Al₂O₃ layer (P. Bowen et al., *Powder Technol.,* 2005, 157, 100-107), the weight of the ZIF-8 phase present in the γ-Al₂O₃ layer was likely to be about 0.005 mg. Considering the total weight of ZIF-8 grains (about 8.4 to 12 mg; Table 3), it can be concluded that almost all ZIF-8 grains in membrane ZIF-8_γα were formed in the α-Al₂O₃ disc portion primarily right below the interface (see FIGS. 5 and 7).

Given the same reaction rate for the synthesis of both membranes, the membrane characteristics from the CD method will be determined by the diffusion rates of the reactants. As the reaction between the Zn precursors and the mim ligands occurs rapidly towards ZIF-8 phases (J. Cravillon et al., *Chem. Mater.,* 2009, 21, 1410-1412; J. Cravillon et al., *CrystEngComm,* 2012, 14, 492-498), the method used to effectively control how the two reactants meet is a key factor to determine final membrane properties. Although the nominal molar ratio of $Zn^{2+}$ to mim in the synthetic precursor solution was 1/8, the actual ratio during membrane synthesis was estimated to be about 1/640. Therefore, the diffusion behavior of $Zn^{2+}$ ions toward the mim ligands was critical for generation of ZIF-8 grains, and thus ZIF-8 films or membranes. In the α-Al₂O₃ disc, the $Zn^{2+}$ ions were likely to diffuse out rapidly and meet the mim ligands to produce ZIF-8 grains even below the surface of the α-Al₂O₃ disc (about 2 μm below) and continued to grow a continuous ZIF-8 membrane on and above the top surface. Further encounters between $Zn^{2+}$ ions and mim ligands would be blocked by the already-synthesized ZIF-8 grains near the top surface of the α-Al₂O₃ disc, resulting in the thin film thickness of membrane ZIF-8_α as shown in FIG. 4(*a*2). On the contrary, introduction of the γ-Al₂O₃ layer (about 5 nm pore size) led to alleviating the effective diffusion rate of $Zn^{2+}$ ions towards the mim ligands in the bulk phase. Specifically, the mesopores in the γ-Al₂O₃ layer would prevent the $Zn^{2+}$ ions from diffusing out promptly so that they would dwell longer, and thus react with mim ligands primarily inside the α-Al₂O₃ disc. The small pore aperture of the γ-Al₂O₃ layer increased mass transfer resistance with respect to the $Zn^{2+}$ ions, resulting in a wide distribution of ZIF-8 grains along the thickness of the γ-/α-Al₂O₃ disc (FIGS. 4(*b*2) and 5(*b*2)) with the partial occupation (about 70%) in the γ-Al₂O₃ layer (FIGS. 7*c* and 7*f*).

Figure 8:
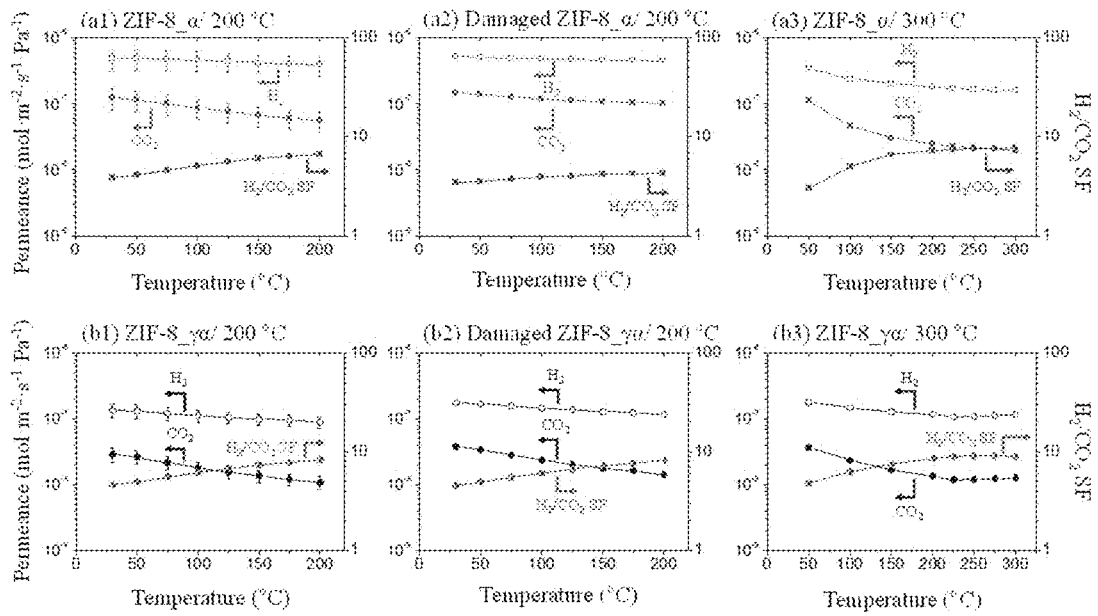
FIG. 8 shows $H_2$/$CO_2$ separation performances of (a1)-(b1) intact and (a2)-(b2) intentionally damaged membranes ZIF-8_$\alpha$ and ZIF-8_$\gamma\alpha$ as a function of temperature up to 200° C. and $H_2$/$CO_2$ separation performances of (a3)-(b3) intact membranes ZIF-8_$\alpha$ and ZIF-8_$\gamma\alpha$ up to 300° C., according to an example of the present invention.

Subsequently, the $H_2$ and $CO_2$ separation performance of both membranes ZIF-8_α and ZIF-8_γα was tested as a function of temperature (FIG. 8). Membrane ZIF-8_α demonstrated a $H_2$ permeance as high as $(3.9 \pm 1.2) \times 10^{-7}$ mol·m⁻²·s⁻¹·Pa⁻¹ and a maximum (max) $H_2/CO_2$ SF of 6.7±0.3 at 200° C., whereas membrane ZIF-8_γα demonstrated a slightly reduced $H_2$ permeance of $(9.0 \pm 1.9) \times 10^{-8}$ mol·m⁻²·s⁻¹·Pa⁻¹ and max $H_2/CO_2$ SF of 8.2±0.5 at 200° C. Further increase in temperature reveals that the max $H_2/CO_2$ SFs were observed at 250° C. in both ZIF-8 membranes (FIGS. 8(*a*3) to 8(*b*3)), though the SFs were still sufficiently high (about 8.9) at 300° C., which can be considered a WGS reaction temperature. Additionally, in an effort to confirm the location of ZIF-8 grains, and simultaneously compare the mechanical stabilities of both membranes, the membranes were intentionally damaged by grinding the top surface with sand paper and were tested for $H_2/CO_2$ permeation (FIGS. 8(*a*2) to 8(*b*2)). While the $H_2/CO_2$ SF of the damaged membrane ZIF-8_α was considerably lowered from about 6.7 to about 4.3 at 200° C., that of the damaged membrane ZIF-8_γα was well preserved at approximately 8.5 at 200° C., strongly supporting that membrane ZIF-8_γα was primarily synthesized more deeply in the interior of the γ-/α-Al₂O₃ disc and desirably, showed higher mechanical stabilities.

In general, the permeance of a permeating species across a membrane is inversely proportional to the membrane thickness. The $H_2$ permeance through membranes ZIF-8_α and ZIF-8_γα in FIGS. 8(*a*1) and 8(*b*1) indicates that membrane ZIF-8_γα is much thicker than membrane ZIF-8_α, which also implies a wide distribution of ZIF-8 grains in the γ-/α-Al₂O₃ disc (FIG. 4(*b*3)). Based on the weight gain (about 11 mg for ZIF-8_α and about 12 mg for ZIF-8_γα; Table 1) after membrane synthesis and the similar porosities (about 41% in Table 1), the present inventors attempted to estimate the effective thickness of the ZIF-8 grains. Assuming a continuous phase in the α-Al₂O₃ disc, the thickness of ZIF-8 grains below the surface was estimated to be 60 μm in membrane ZIF-8_α (excluding the about 3 μm thick ZIF-8 phase on top of the surface) and 80 μm in membrane ZIF-8_γα. However, the ZIF-8 grains in membrane ZIF-8_α were not likely to be continuously formed inside, as shown in FIG. 5(*b*2). Therefore, the two membranes can be visualized; the 5 μm thick (3 μm above the surface and 2 μm below the surface) membrane ZIF-8_α vs. the 80 μm thick (below the interface) membrane ZIF-8_γα (comparable to the EDX result shown in FIG. 4(*b*3)).

Figure 9:
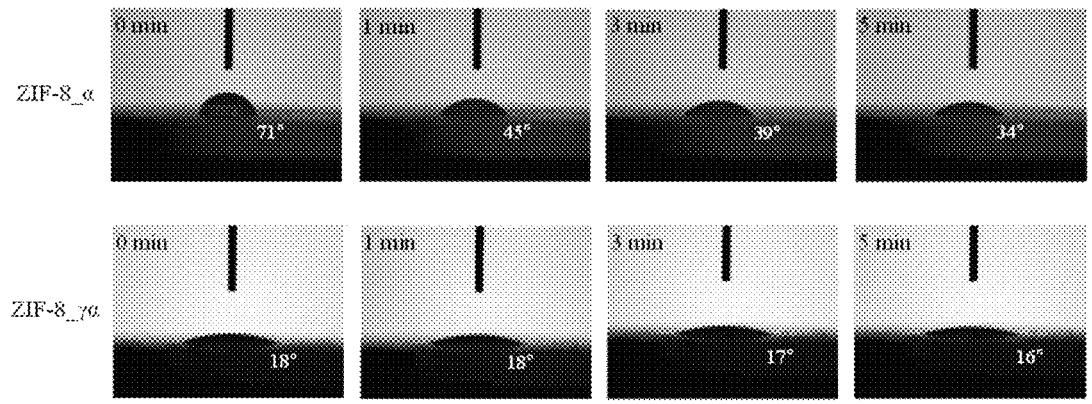
FIG. 9 shows the contact angle of a water droplet on membranes ZIF-8_$\alpha$ (top) and ZIF-8_$\gamma\alpha$ (bottom) according to an example of the present invention.

The grain boundary defects are easily formed during thermal activation processes due to the difference in thermal expansion behaviors between the membrane and support (X. Dong et al., *J. Mater. Chem.*, 2012, 22, 19222-19227). As the amount of the ZIF-8 grains were comparable in membranes ZIF-8_α and ZIF-8_γα, one could conclude that the ZIF-8 grains that formed on the α-$Al_2O_3$ disc in membrane ZIF-8_α were more defective (FIG. 8). In contrast, during thermal activation through solvent removal, the ZIF-8 grains inside the α-$Al_2O_3$ disc will be kept in place, and thus less-defective membrane ZIF-8_γα could be fabricated. The rapid decrease in the transient measurement of the contact angle of a water droplet (up to 5 minutes) also supported that membrane ZIF-8_α was more defective (FIG. 9)), though it was seemingly continuous when viewed at SEM resolution (FIGS. 4(*a*1) and 4(*a*2)). The benefit of the continuous film formation inside porous supports, known as a confinement effect, contributed to acquiring higher $H_2/CO_2$ SFs through membrane ZIF-8_γα (N. Hara et al., *J. Membr. Sci.*, 2014, 450, 215-223; H. T. Kwon et al., *Chem. Commun.*, 2013, 49, 3854-3856; H. T. Kwon et al., *J. Am. Chem. Soc.*, 2013, 135, 10763-10768; Y. Pan et al., *J. Membr. Sci.*, 2012, 390-391, 93-98; M. N. Shah et al., *Langmuir*, 2013, 29, 7896-7902).

Although the permeation rate across a microporous membrane is a coupled function of adsorption and diffusion of guest molecules, the ideal permeation selectivity, estimated by a simple product of the adsorption and diffusion selectivities, serves as an effective indicator for evaluating its separation performances (R. Krishna et al., *J. Membr. Sci.*, 2010, 360, 323-333; A. Battisti et al., *Microporous Mesoporous Mater.*, 2011, 143, 46-53; R. De Lange et al., *J. Porous Mater.*, 1995, 2, 141-149; R. Krishna et al., *PCCP*, 2011, 13, 10593-10616). In the present invention, the adsorption of $CO_2$ is stronger than that of $H_2$ in ZIF-8 (or ZIF) materials, whereas the smaller $H_2$ molecule diffuses faster in ZIF-8s than the larger $CO_2$ molecule. Thus, the product of their diffusion coefficients and Henry's constants are likely to end up with a same order of magnitude, reflecting the challenging task of $H_2/CO_2$ separation through ZIF-8 membranes. Even, the MD simulation showed a linear correlation between the diffusion coefficients of the larger $CO_2$ molecule (A. Battisti et al., *Microporous Mesoporous Mater.*, 2011, 143, 46-53; D. Liu et al., *J. Phys. Chem. C*, 2009, 113, 5004-5009) and the pore size, suggesting difficulty in separating $H_2/CO_2$ mixtures via reduction of the pore size. In this circumstance, the fact that the max $H_2/CO_2$ SF in membrane ZIF-8_γα was about 20% higher relative to that in membrane ZIF-8_α indicates a notable quality of membrane ZIF-8_γα. As the simplified version of the permeance can be expressed by the product of the diffusivity and adsorption constant (R. Krishna et al., *Chem. Eng. J.*, 2007, 133, 121-131), the apparent activation energies were estimated from the permeances, which were −2.6 kJ/mol for $H_2$ and −6.7 kJ/mol for $CO_2$ in membrane ZIF-8_α and −3.1 kJ/mol for $H_2$ and −7.5 kJ/mol for $CO_2$ in membrane ZIF-8_γα. Assuming that adsorption behaviors of $H_2$ and $CO_2$ are identical for both membranes, the difference in the activation energies of $H_2$ between membranes ZIF-8_α and ZIF-8_γα was 0.5 kJ/mol, whereas the difference for $CO_2$ diffusion was 0.8 kJ/mol. Accordingly, the resulting activation energy difference between $H_2$ and $CO_2$ in membrane ZIF-8_γα was 0.3 kJ/mol higher than that in membrane ZIF-8_α, possibly implying that the ZIF-8 grains confined inside supports were less flexible.

Figure 10:
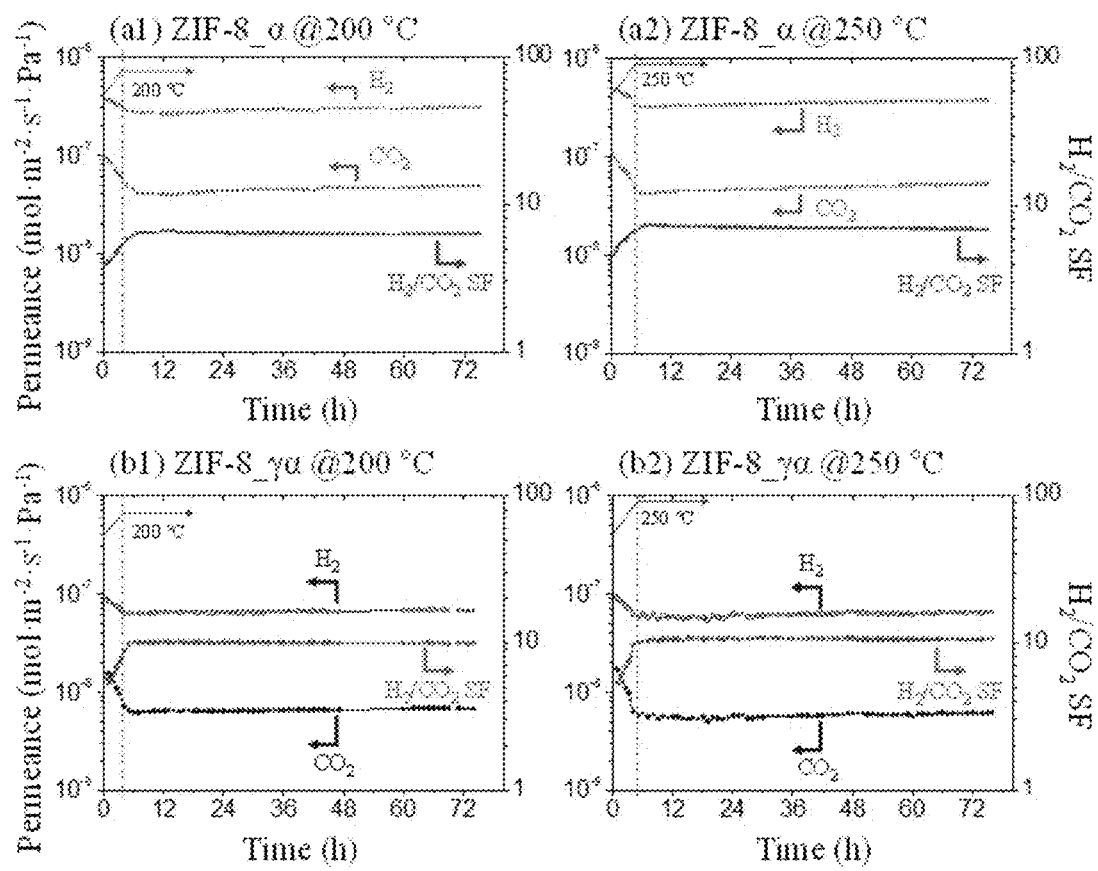
FIG. 10 shows the $H_2$/$CO_2$ separation performance of membranes (a1)-(a2) ZIF-8_$\alpha$ and (b1)-(b2) ZIF-8_$\gamma\alpha$ tested to investigate their thermal stabilities up to 72 h at 200 and 250° C. according to an example of the present invention.
Figure 11:
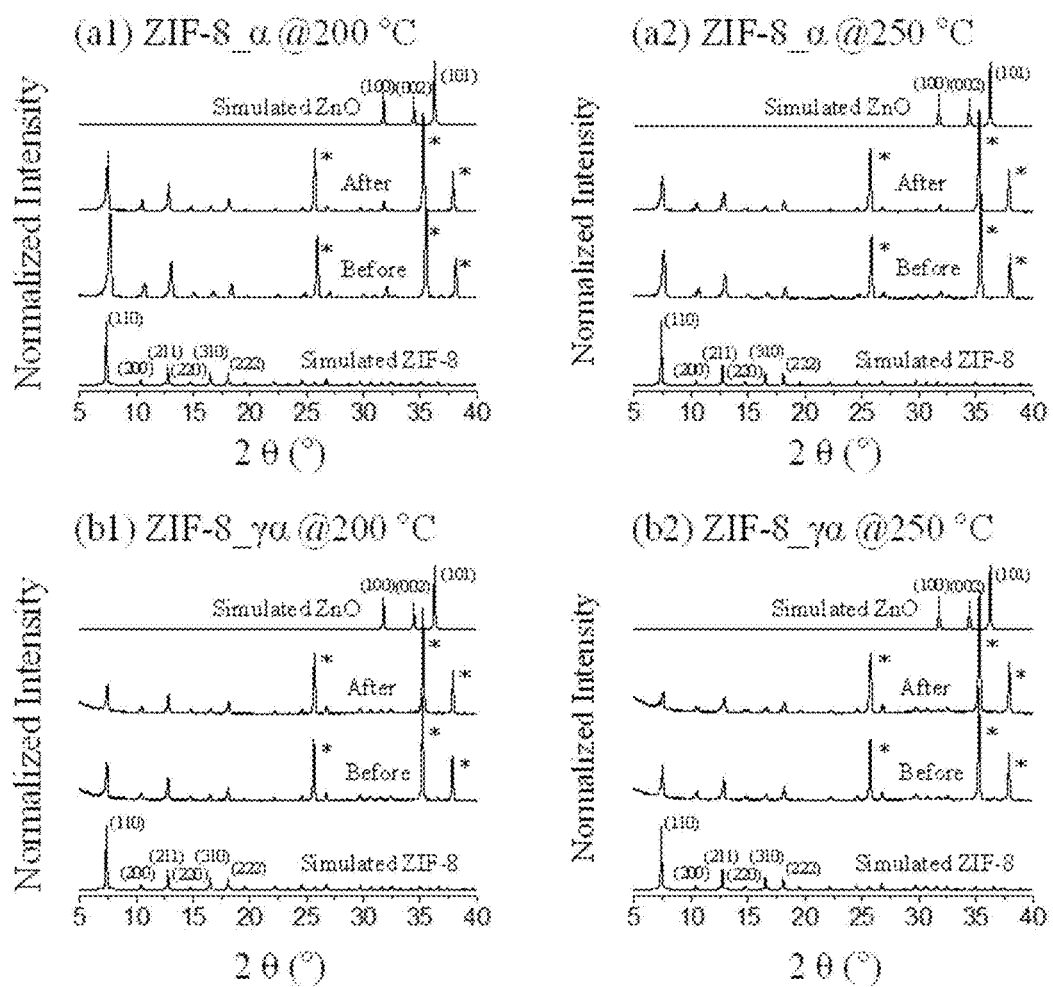
FIG. 11 shows XRD patterns of membranes (a1)-(a2) ZIF-8_$\alpha$ and (b1)-(b2) ZIF-8_$\gamma\alpha$ before and after the long-term stability tests at 200 and 250° C. according to an example of the present invention.
Figure 12:
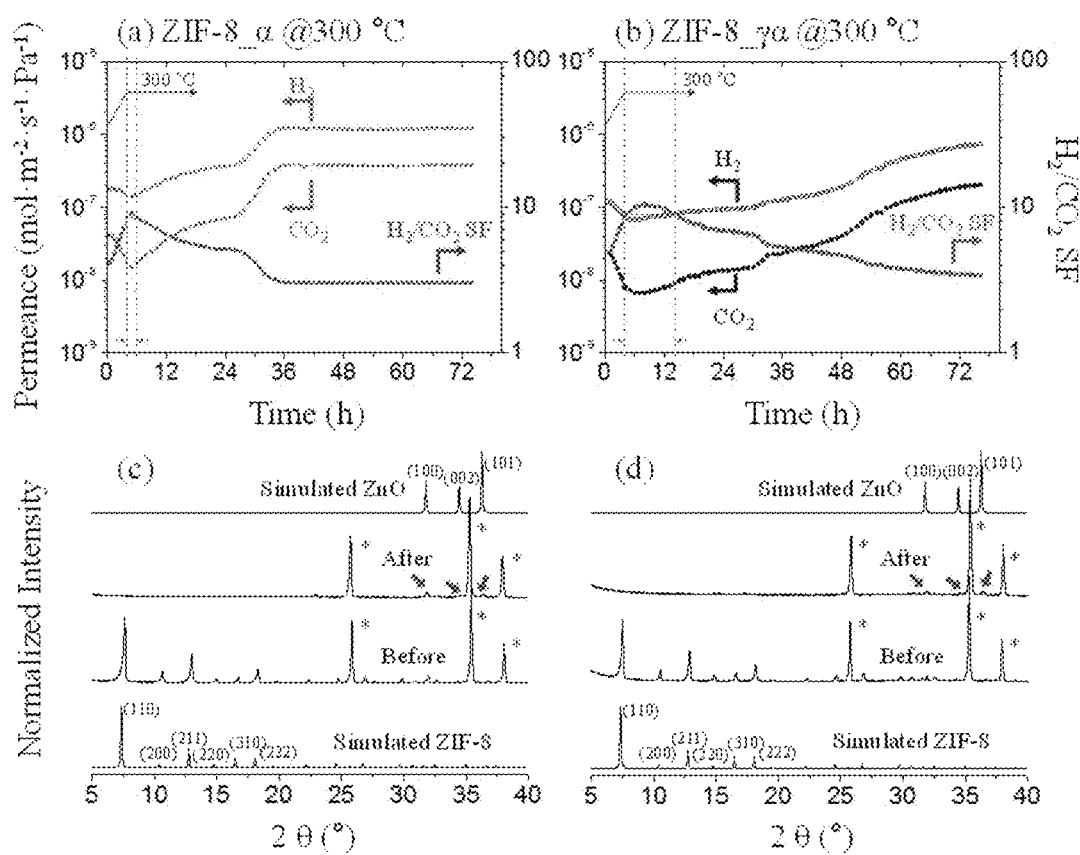
FIG. 12 shows the $H_2$/$CO_2$ separation performances of membranes (a) ZIF-8_$\alpha$ and (b) ZIF-8_$\gamma\alpha$ measured at 300° C. up to 72 h along with (c)-(d) their XRD patterns before and after the thermal stability test according to an example of the present invention.

Recognizing the discrepancy in the permeation results in membranes ZIF-8_α and ZIF-8_γα, the present inventors further tested their long-term thermal stabilities in an attempt to assure their validity for the ultimate usage in the WGS membrane reactor (FIGS. 10 to 12). Over a measurement period of 2 days, the ZIF-8 particles were reported to maintain their structures up to 200° C. under ambient conditions, though the ZIF-8 membranes, prepared via the seeded growth method, were recently reported to gradually lose their $H_2/CO_2$ separation ability even at 150° C. (Y. Lin et al., *7th International Zeolite Membrane Meeting*, in Dalian, China. 2016). Based on the particle experiment, three temperatures, 200, 250, and 300° C., were chosen to determine the thermal stabilities of membranes ZIF-8_α and ZIF-8_γα for up to 72 hours. The present inventors found that the permeation results and structures were well preserved at 200° C. and 250° C. for up to 72 hours in both membranes ZIF-8_α and ZIF-8_γα (FIGS. 10 and 11). However, at the higher temperature of 300° C., the separation performance gradually deteriorated with time to a different degree for each membrane (FIG. 12). Specifically, membrane ZIF-8_α failed to sustain the $H_2/CO_2$ separation ability almost immediately after reaching the target temperature of 300° C. (about 2 hours), whereas membrane ZIF-8_γα could maintain its ability for up to about 10 hours at the same temperature.

Figure 13:
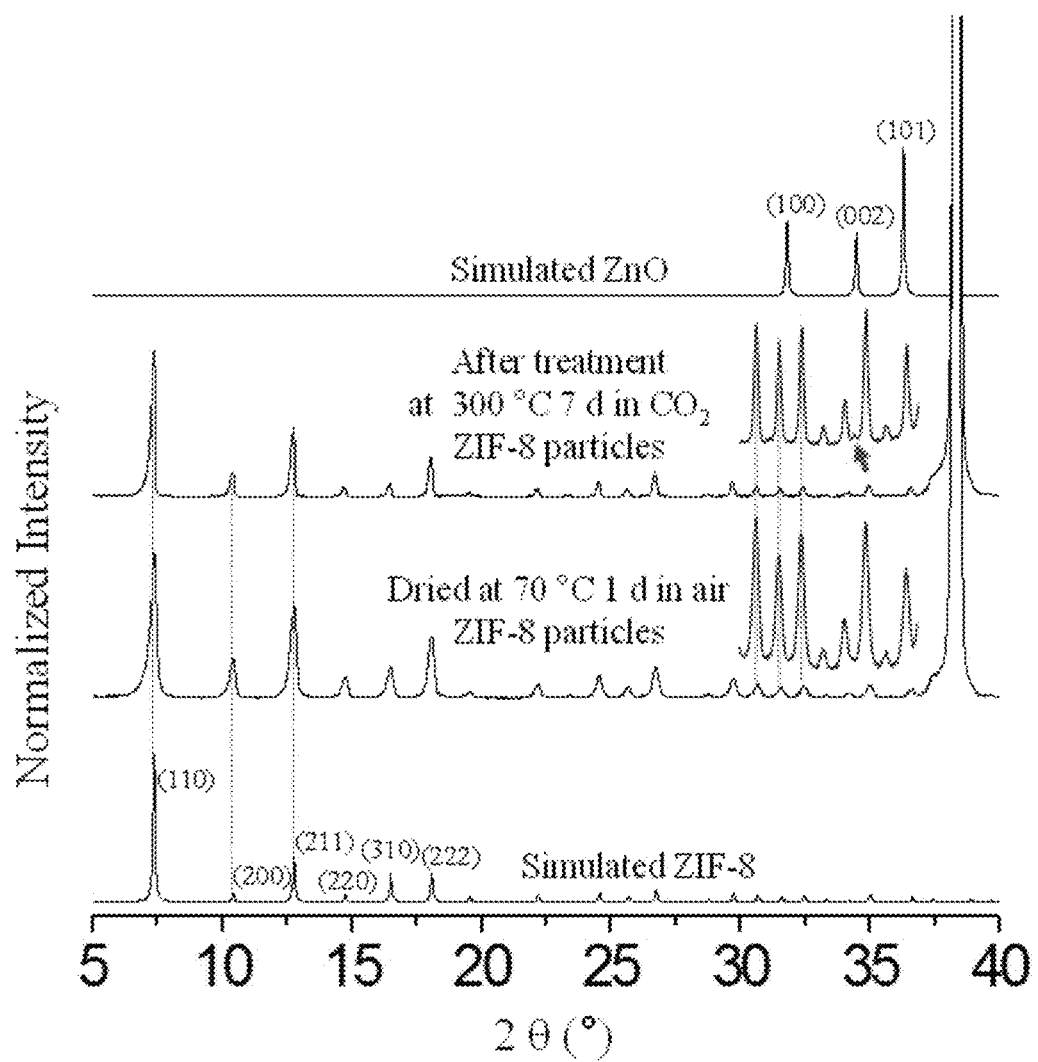
FIG. 13 shows XRD patterns of ZIF-8 particles dried at 70° C. for 24 h and heat-treated at 300° C. for 7 days in a $CO_2$ environment according to an example of the present invention.

This demonstrates the desirability of forming ZIF-8 grains embedded in the porous supports (FIGS. 12*a* and 12*b*) to improve both the thermal and mechanical stabilities (FIG. 8(*b*2)). The XRD analysis reveals that the deteriorated separation ability over time at 300° C. can be correlated with the collapse of ZIF-8 structures and the eventual phase transition into zinc oxide (FIGS. 12*a* and 12*d*). The phase transition was supported by the onset of zinc oxides from ZIF-8 particles under similar conditions (FIG. 13). The initial thermal degradation, plausibly associated with the disconnected coordination between Zn atoms and mim molecules, is analogous to the carbonization process under inert conditions (S. Gadipelli et al., *Energy Environ. Sci.*, 2014, 7, 2232-2238).

The improvement in the thermal stability of membrane ZIF-8_γα can be attributed to the wide distribution of ZIF-8 grains inside the support with the effective thickness of about 80 μm as mentioned above (FIG. 4(*b*3)). The enlarged thickness of the ZIF-8 phase in membrane ZIF-8_γα and the cohesive ZIF-8 phase filling the pores were seemingly beneficial for resisting thermal degradation toward the inevitable phase transition. This suggests that ZIF-8 grains, deeply embedded in the α-$Al_2O_3$ disc, were sufficiently abundant so that a longer duration was required in membrane ZIF-8_γα as structural degradation would take place sequentially toward the inside of the α-$Al_2O_3$ disc. Consequently, this structural difference can account for the discrepancy in thermal stability of ZIF-8 membranes (obtained by seeded growth) (Y. Lin et al., *7th International Zeolite Membrane Meeting*, in Dalian, China. 2016) and membrane ZIF-8_α and ZIF-8_γα (obtained by the CD method).

In FIG. 8, the present inventors compared the $H_2/CO_2$ separation performances of membranes ZIF-8_α and ZIF-8_γα with those of other types of ZIF membranes reported in the literature (Y. Li et al., *J. Membr. Sci.*, 2010, 354, 48-54; Y.-S. Li et al., *Adv. Mater.*, 2010, 22, 3322-3326; Y.-S. Li et al., *Angew. Chem. Int. Ed.*, 2010, 49, 548-551; V. M. Aceituno Melgar et al., *J. Membr. Sci.*, 2014, 459, 190-196; S.-J. Noh et al., *J. Nanosci. Nanotechnol.*, 2015, 15, 575-578; K. Huang et al., *Chem. Commun.*, 2013, 49, 10326-10328; Q. Liu et al., *J. Am. Chem. Soc.*, 2013, 135, 17679-17682; G. Xu et al., *J. Membr. Sci.*, 2011, 385-386, 187-193; Y. Zhu et al., *Sep. Purif. Technol.*, 2015, 146, 68-74; A. Huang et al., *Angew. Chem. Int. Ed.*, 2010, 49, 4958-4961; X. Dong et al., *J. Mater. Chem.*, 2012, 22, 19222-19227; A. Huang et al., *Angew. Chem. Int. Ed.*, 2011, 50, 4979-4982; A. Huang et al., *J. Am. Chem. Soc.*, 2010, 132, 15562-15564; A. Huang, N. Wang, C. Kong, J. Caro, *Angew. Chem. Int. Ed.*, 2012, 51, 10551-10555; A. Huang et al., *Chem. Commun.*, 2012, 48, 10981-10983; H. Bux et al., *Chem. Mater.*, 2011, 23, 2262-2269; L. Fan et al., *J. Mater. Chem.*, 2012, 22, 25272-25276). In particular, only the permeation results obtained with the $H_2$ and $CO_2$ binary mixtures were collected and plotted in FIG. 14. Based on a substantial literature survey, the present inventors recognized that many researchers reported $H_2/CO_2$ separations at low temperatures. In particular, the max temperature reported for testing the performance of ZIF-8 membranes was about 150° C., though the $H_2/CO_2$ separation ability is more useful at higher temperatures. Polymeric membranes that have a high processability and an inexpensive manufacturing/operating cost are desirable for performing the $H_2/CO_2$ separation at low temperatures. As shown in FIG. 8, one may conclude that the $H_2/CO_2$ separation performance of membrane ZIF-8_$\gamma\alpha$ in the present invention was modest and rather inferior to that of other membranes reported in the literature. However, the present inventors would like to emphasize that the $H_2/CO_2$ SFs through membrane ZIF-8_$\gamma\alpha$ were highest among those reported for ZIF-8 membranes. More importantly, the $H_2/CO_2$ SFs through membrane ZIF-8_$\gamma\alpha$ at temperatures of 250 and 300° C. were 10.8 and 10.1, respectively, which were more than twice of the $H_2/CO_2$ SF (about 4.7) determined in the Knudsen diffusion regime.

Figure 14:
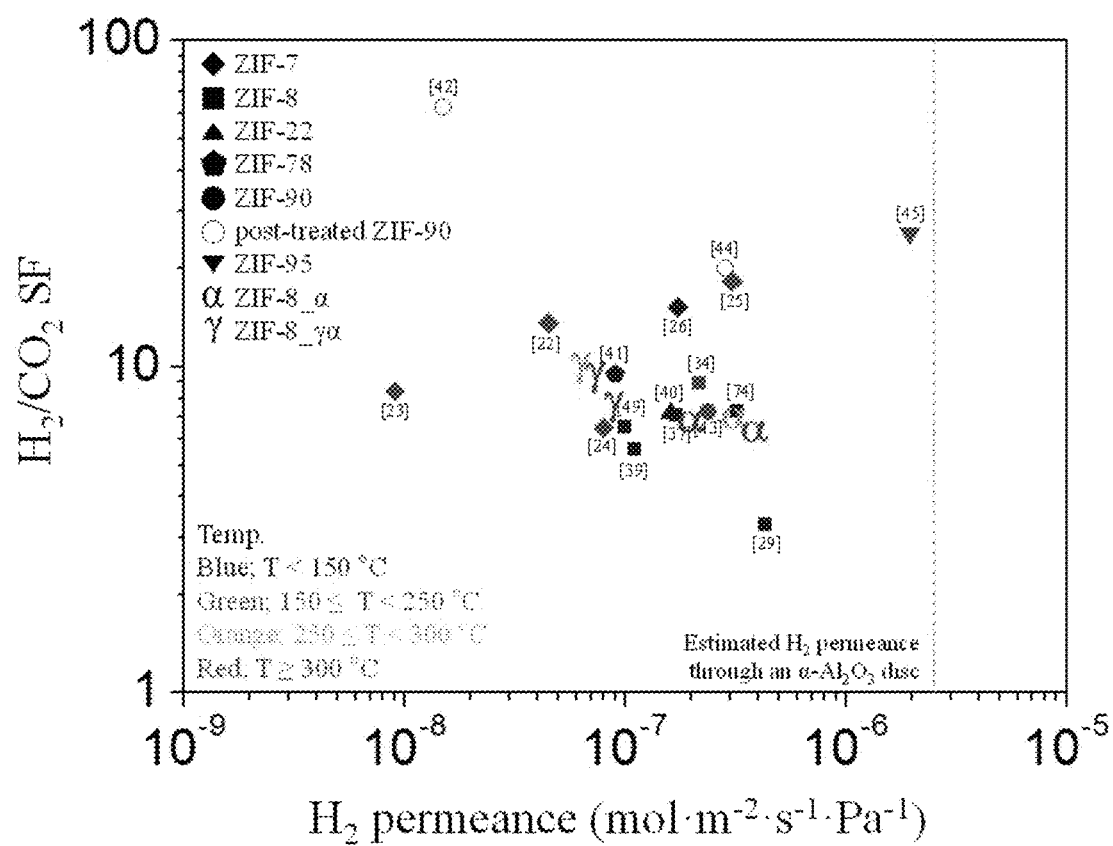
FIG. 14 is a graph showing $H_2$/$CO_2$ SFs vs. $H_2$ permeance through membranes ZIF-8_$\alpha$ (denoted by $\alpha$) and ZIF-8_$\gamma\alpha$ (denoted by $\gamma$) along with those through other types of ZIF membranes according to an example of the present invention.

Among the many ZIF membranes, ZIF-95 membranes showed the highest $H_2/CO_2$ separation performance with a $H_2/CO_2$ SF of about 25.7 at about 325° C. (FIG. 14). This is the highest temperature with the highest $H_2/CO_2$ separation performance for ZIF type membranes. Interestingly, although the pore size (0.37 nm) of ZIF-95 is larger than that (0.34 nm) of ZIF-8, the resulting ZIF-95 membrane showed much superior $H_2/CO_2$ performance. Ironically, this implies that the performance of membrane ZIF-8_$\gamma\alpha$ can be further ameliorated mainly via reducing non-ZIF defective structures. Despite the high performance of ZIF-95 membranes, a sealing issue needs to be addressed because silicone O-rings, which are only effective up to about 200° C., were used as sealants in the literature (A. Huang et al., *Chem. Commun.*, 2012, 48, 10981-10983). In addition, the use of a very expensive ligand (5-chlorobenzimidazol) for the synthesis of ZIF-95 should be overcome for practical use. In addition to ZIF-95, ZIF-90 membranes treated with 3-aminopropyltrimethoxysilane (APTES) also demonstrated high $H_2/CO_2$ separation performance with a $H_2/CO_2$ SF of 62.5 at about 225° C., though the effects of the silicone O-rings on performance should be confirmed via a long-term permeation measurement. Furthermore, the surface modified with APTES, which causes a complicated manufacturing process, was required for the synthesis of ZIF-90 membranes. In addition, the ZIF-7 membrane with a pore size of about 0.29 nm was shown to be effective for $H_2/CO_2$ separations, though their flexible structural transition during removal of the solvent (DMF; 0.55 nm) should be addressed appropriately. Coincidentally, the synthesis of both ZIF-90 and -95 requires the use of DMF as solvent. Considering the pore sizes of ZIF-90 (0.35 nm) and –95 (0.37 nm), a careful investigation into activation processes that are directly relevant to stress generation during the removal of occluded DMFs should be conducted. In fact, it was addressed that ZIF-7 and -78 membranes suffered from defects, which were seemingly generated during DMF removal, requiring the introduction of an alternative approach. In this aspect, ZIF-8 membranes are highly desirable because smaller and more volatile solvents (such as water (0.268 nm) and methanol (0.36 nm)) than DMF can be used (Y. Pan et al., *Chem. Commun.*, 2011, 47, 10275-10277; Y. Pan et al., *J. Membr. Sci.*, 2012, 390-391, 93-98; H. Bux et al., *J. Am. Chem. Soc.*, 2009, 131, 16000-16001; H. Bux et al., *Chem. Mater.*, 2011, 23, 2262-2269). Therefore, the present inventors would like to emphasize that membrane ZIF-8_$\gamma\alpha$, mainly formed inside porous supports via introduction of the diffusion barrier, is highly promising for use in mass production due to its simple synthesis protocol, robust separation performance, and high chemical and mechanical stabilities.

In the present invention, a simple yet reliable method to adjust the diffusion rate of ZIF-8 precursors via a pore size reduction of supports with a $\gamma$-$Al_2O_3$ layer (pore size: 5 nm) on top of an $\alpha$-$Al_2O_3$ disc (pore size: 150 nm) allowed for embedding ZIF-8 grains inside the porous support, and thus manufacturing continuous ZIF-8 membranes. Based on the direct measurement of $N_2$ physisorption, it was found that the ZIF-8 grains in membrane ZIF-8_$\gamma\alpha$ was pre-dominantly formed inside the $\alpha$-$Al_2O_3$ disc, while filling about 70% of the mesopores in the $\gamma$-$Al_2O_3$ layer. The resulting membrane ZIF-8_$\gamma\alpha$ showed a max $H_2/CO_2$ SF of 9.8±0.9 at 250° C. compared to 8.0±1.1 for membrane ZIF-8_$\alpha$. More importantly, membrane ZIF-8_$\gamma\alpha$ showed highly improved mechanical and thermal stabilities, as evidenced by preserved separation performance after intentional surface grinding and by sustaining $H_2/CO_2$ separation performance at 300° C. for a longer duration, respectively. The high stabilities and $H_2/CO_2$ separation performance make membrane ZIF-8_$\gamma\alpha$ highly desirable for reliable $H_2/CO_2$ separations at high temperatures. Currently, the present inventors are attempting to manufacture ZIF-8 membranes on $\gamma$-$Al_2O_3$ layer-coated $\alpha$-$Al_2O_3$ tubes in an effort to use them to carry out WGS reactions to achieve the optimal membrane reactor configuration.

INDUSTRIAL APPLICABILITY

The membrane according to the present invention is positioned inside a hierarchically structured porous support by the counter diffusion method so that the membrane can have an increased stability against physical changes caused by external impact or the like, and is not exposed directly to high-temperature gases, unlike a conventional membrane that shows low thermal stability due to direct contact with high-temperature $H_2$ and $CO_2$ gases, and thus can ensure higher thermal stability than the conventional membrane.

Additionally, according to the present invention, the diffusion rate of $Zn^{2+}$ metal ions decreases so that an increased amount of the $Zn^{2+}$ metal ions can react with 2-methylimidazole inside the porous support, thereby forming a continuous membrane. A conventional membrane is mostly synthesized on the top of a support, whereas the present invention has features in that a continuous membrane can be formed while filling the inside of a porous support, and the thickness of the membrane can be controlled according to the degree of filling the pores. In addition, the membrane of the present invention is formed while filling the pores so that membrane defects that may occur incidentally in the thermal activation process can be reduced, thereby ensuring relatively high hydrogen separation ability (e.g., separation from $H_2/CO_2$ or syngas) compared to a conventional membrane.

Although the present invention has been described in detail with reference to the specific features, it will be apparent to those skilled in the art that this description is only for a preferred embodiment and does not limit the scope of the present invention. Thus, the substantial scope of the present invention will be defined by the appended claims and equivalents thereof.

What is claimed is:

1. A method of preparing a porous membrane, comprising:
coating particles on a porous support to form a layer comprising pores smaller than pores of the porous support to synthesize a hierarchically structured porous support; and
performing counter diffusion to synthesize a membrane comprising zeolitic imidazolate frameworks (ZIFs) formed inside the hierarchically structured porous support,
wherein the pores of the layer have a pore size of 2 to 50 nm, and
wherein the performing counter diffusion comprises immersing the hierarchically structured porous support in a metal salt solution, and then in an imidazole or imidazole derivative solution.

2. The method of preparing a porous membrane of claim 1, wherein the performing counter diffusion comprises adsorbing $Zn^{2+}$ or $Co^{2+}$ on the porous support by immersing the hierarchically structured porous support synthesized in the coating particles in a zinc salt solution or a cobalt salt solution, and then forming $Zn^{2+}$ or $Co^{2+}$ imidazole crystals inside the porous support by immersing the porous support adsorbed with $Zn^{2+}$ or $Co^{2+}$ in an imidazole or imidazole derivative solution.

3. The method of preparing a porous membrane of claim 1, wherein the pores of the layer are formed on one side of the hierarchically structured porous support.

4. The method of preparing a porous membrane of claim 3, wherein the porous support has a pore size of 50 to 1000 nm.

5. The method of preparing a porous membrane of claim 1, wherein the particles are at least one selected from the group consisting of α-alumina, γ-alumina, silica, glass, mullite, zirconia, titania, yttria, ceria, vanadia, silicone, stainless steel, calcium oxide, phosphor oxide and mixtures thereof.

6. The method of preparing a porous membrane of claim 1, wherein the metal salt is at least one selected from the group consisting of zinc nitrate, zinc acetate, zinc chloride, zinc sulfate, zinc bromide and zinc iodide.

7. The method of preparing a porous membrane of claim 1, wherein the metal salt is at least one selected from the group consisting of cobalt nitrate, cobalt acetate, cobalt chloride, cobalt sulfate, cobalt bromide and cobalt iodide.

8. The method of preparing a porous membrane of claim 1, wherein the imidazole or imidazole derivative is at least one selected from the group consisting of benzimidazole, 2-methylimidazole, 4-methylimidazole, 2-methylbenzimidazole, 2-nitroimidazole, 5-nitrobenzimidazole and 5-chlorobenzimidazole.

9. The method of preparing a porous membrane of claim 1, wherein the metal salt solution, or the imidazole or imidazole derivative solution is dissolved in at least one solvent selected from the group consisting of methanol, ethanol, propanol, iso-propanol, tert-butanol, n-butanol, methoxyethanol, ethoxyethanol, dimethylacetateamide, dimethylformamide, N-methyl-2-pyrrolidone (NMP), formic acid, nitromethane, acetic acid and distilled water.

10. The method of preparing a porous membrane of claim 1, wherein the porous membrane has a thickness of 0.1 to 500 μm.

11. A porous membrane prepared by the method of claim 1, wherein the ZIFs are formed inside the hierarchically structured porous support comprising a layer having pores of 2 to 50 nm, wherein the layer is formed by coating ceramic particles on one side of a ceramic support.

12. A method of separating hydrogen from a mixed gas of $H_2$ and $CO_2$ or syngas using the porous membrane of claim 11.

13. The method of separating hydrogen of claim 12, wherein the separating hydrogen is performed at a temperature of 100 to 500° C.

14. The porous membrane of claim 11, wherein the ceramic support is a porous support comprising pores of 50 to 1000 nm.

15. The porous membrane of claim 11, wherein the porous membrane has a thickness of 0.1 to 500 μm.